US009278664B2

(12) United States Patent
Fukurono et al.

(10) Patent No.: US 9,278,664 B2
(45) Date of Patent: Mar. 8, 2016

(54) PASSENGER SEAT AIRBAG APPARATUS AND A FOLDED AIRBAG USED THEREIN

(71) Applicant: TOYODA GOSEI CO., LTD., Kiyosu-shi, Aichi-ken (JP)

(72) Inventors: Kenichi Fukurono, Kiyosu (JP); Mikine Hayashi, Kiyosu (JP); Junichi Asanuma, Kiyosu (JP); Junichi Fujita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/221,333

(22) Filed: Mar. 21, 2014

(65) Prior Publication Data

US 2014/0291971 A1   Oct. 2, 2014

(30) Foreign Application Priority Data

Mar. 29, 2013 (JP) .................................. 2013-072914

(51) Int. Cl.
| | |
|---|---|
| *B60R 21/237* | (2006.01) |
| *B60R 21/205* | (2011.01) |
| *B60R 21/215* | (2011.01) |
| *B60R 21/2165* | (2011.01) |
| *B60R 21/217* | (2011.01) |

(52) U.S. Cl.
CPC ............. *B60R 21/237* (2013.01); *B60R 21/205* (2013.01); *B60R 21/215* (2013.01); *B60R 21/217* (2013.01); *B60R 21/2165* (2013.01); *B60R 2021/21506* (2013.01)

(58) Field of Classification Search
CPC ............................ B60R 21/205; B60R 21/237
See application file for complete search history.

(56) References Cited

U.S. PATENT DOCUMENTS

| | | | | |
|---|---|---|---|---|
| 5,813,692 A * | 9/1998 | Faigle et al. | ............... | 280/728.2 |
| 5,904,367 A * | 5/1999 | Warnez et al. | ............. | 280/728.3 |
| 6,203,056 B1 * | 3/2001 | Labrie et al. | ............... | 280/728.3 |
| 6,276,740 B1 * | 8/2001 | Mellor et al. | ................... | 296/72 |
| 6,296,277 B1 * | 10/2001 | Bittinger et al. | ............. | 280/748 |
| 6,299,202 B1 | 10/2001 | Okada et al. | | |
| 7,234,724 B1 * | 6/2007 | Cowelchuk et al. | ........ | 280/728.2 |
| 2003/0011178 A1 * | 1/2003 | Choi et al. | ..................... | 280/732 |
| 2003/0184063 A1 * | 10/2003 | Yasuda et al. | ................. | 280/732 |
| 2003/0197359 A1 | 10/2003 | Heath | | |
| 2005/0167958 A1 * | 8/2005 | Okada et al. | .................. | 280/732 |
| 2005/0206143 A1 * | 9/2005 | Webber | ........................ | 280/736 |
| 2005/0212269 A1 * | 9/2005 | Schneider | ................. | 280/728.3 |

(Continued)

FOREIGN PATENT DOCUMENTS

| | | |
|---|---|---|
| JP | 11-034783 A | 2/1999 |
| JP | 2000-190798 A | 7/2000 |
| JP | 2005-527424 A | 9/2005 |

*Primary Examiner* — Barry Gooden, Jr.
(74) *Attorney, Agent, or Firm* — Posz Law Group, PLC

(57) ABSTRACT

A folded airbag includes an outer circumferential wall which has a passenger side panel section disposed at a passenger side when inflation of the folded airbag is completed and a vehicle body side panel section extending forward from the passenger side panel section when the inflation of the folded airbag is completed, and an inlet opening which is positioned at a front lower side of the vehicle body side panel section when the inflation of the folded airbag is completed. The folded airbag is formed by folding an unfolded airbag body through front-to-back reduction folding that reduces a size of the unfolded folded body in a front-to-back direction so that a length of the folded airbag in a lateral direction is greater than a length of the folded airbag in a front-to-back direction.

3 Claims, 22 Drawing Sheets

(56) References Cited

U.S. PATENT DOCUMENTS

2006/0006633 A1* 1/2006 Bito .................. 280/740
2006/0049618 A1* 3/2006 Bito .................. 280/732
2008/0061536 A1* 3/2008 Hasebe et al. ........... 280/729
2009/0194982 A1* 8/2009 Yamauchi et al. ........ 280/732
2011/0204607 A1* 8/2011 Dumbrique et al. ....... 280/743.1
2012/0013106 A1* 1/2012 Sato et al. ............ 280/729
2012/0126515 A1* 5/2012 Miyata ................ 280/730.1
2013/0001930 A1* 1/2013 Yamada ................ 280/728.2
2013/0001937 A1* 1/2013 Yamada ................ 280/732

* cited by examiner

FIG. 9A
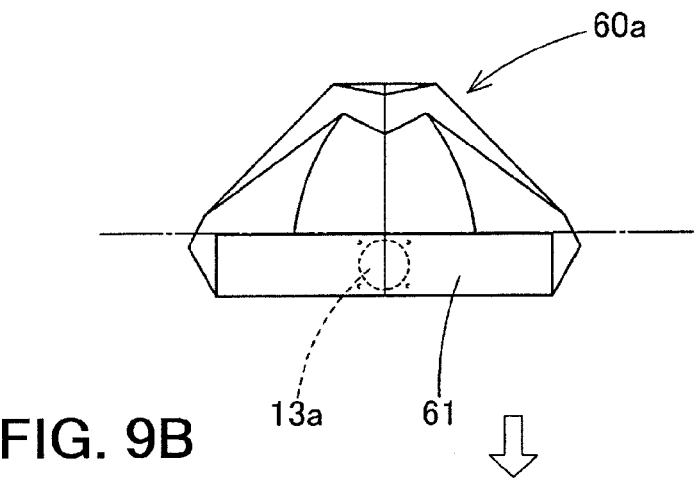
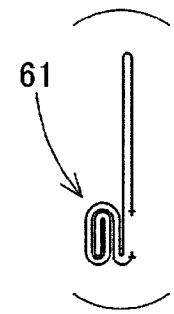
FIG. 9B
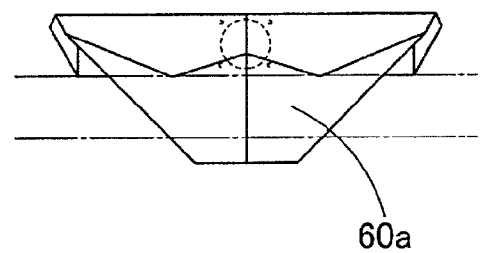
FIG. 9C
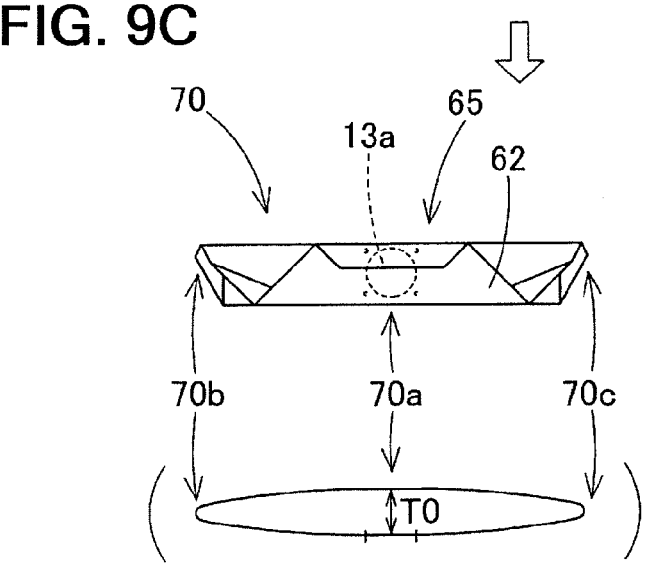
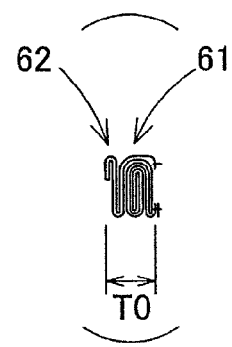

FIG. 12A
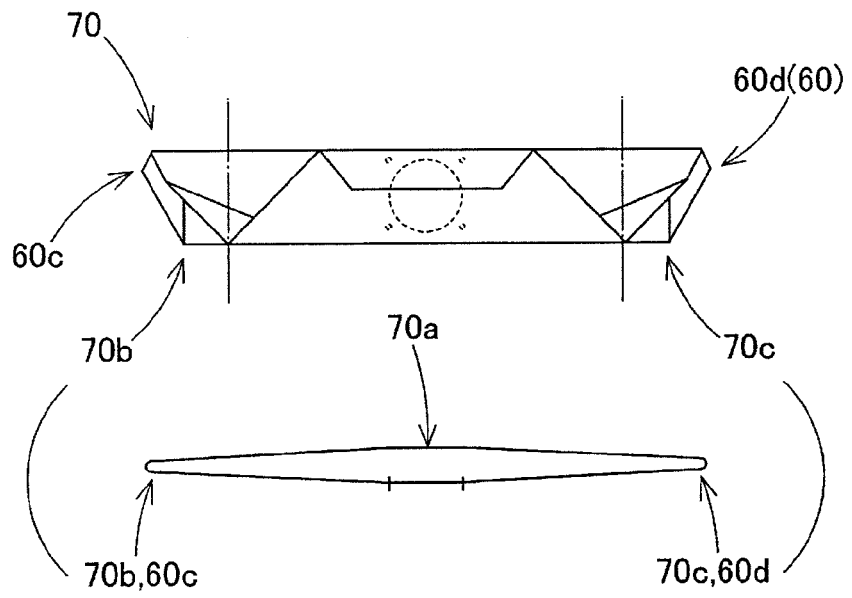
FIG. 12B
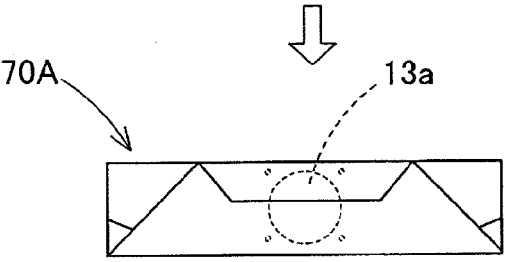
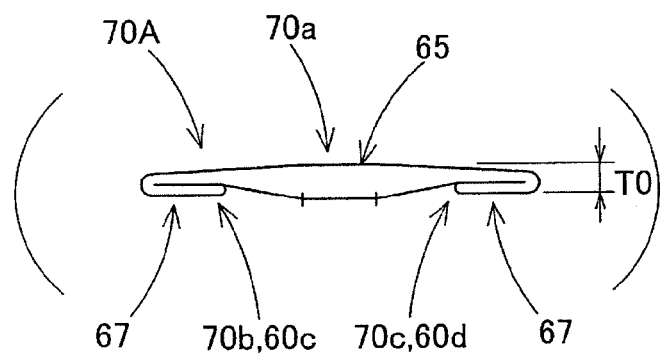

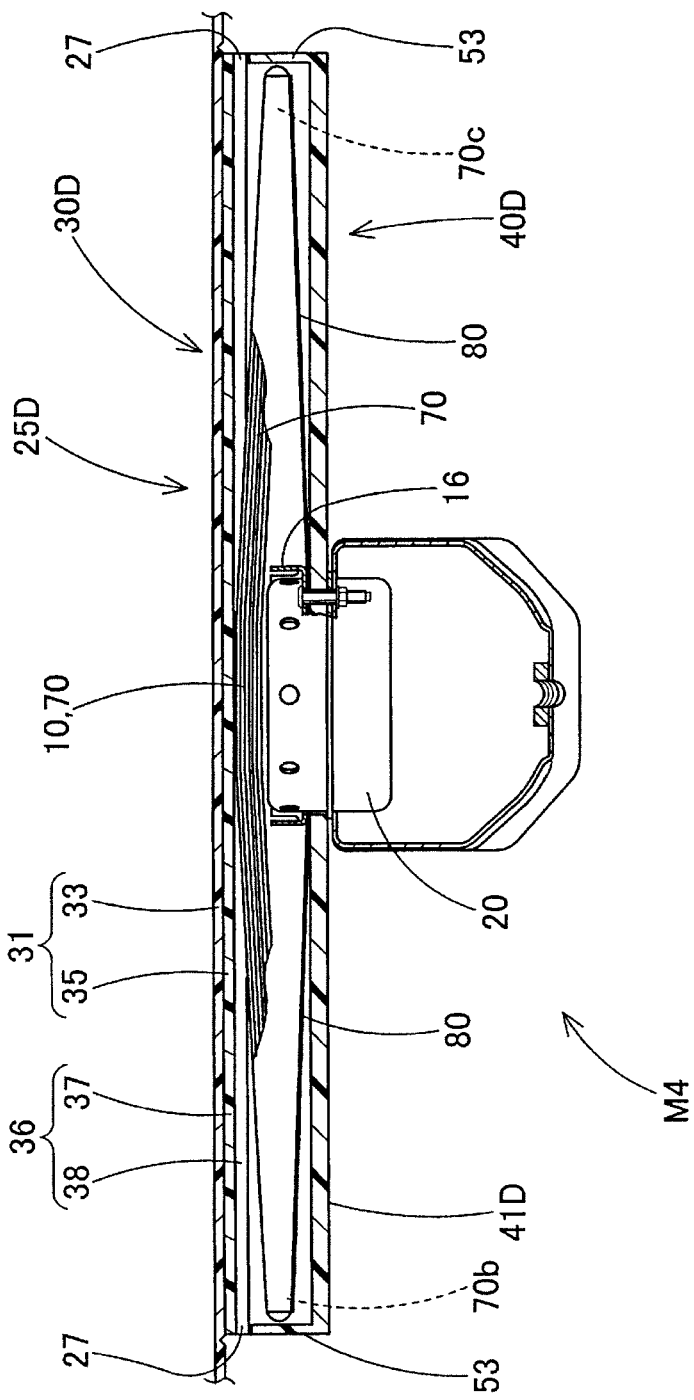

PASSENGER SEAT AIRBAG APPARATUS AND A FOLDED AIRBAG USED THEREIN

CROSS-REFERENCE TO RELATED APPLICATION

This application is based on Japanese Patent Application No. 2013-072914 filed on Mar. 29, 2013, the contents of which are incorporated herein by reference.

BACKGROUND OF THE INVENTION

1. Technical Field

The present invention relates to a passenger seat airbag apparatus which deploys and inflates an airbag from an upper side of an instrument panel that is in front of the passenger seat next to the driver's seat and provides cushion protection to a passenger in the passenger seat using the inflated airbag. The present invention also relates to a folded airbag used in the passenger seat airbag apparatus.

2. Background Art

In the related art, a passenger seat airbag apparatus is mounted on an upper side of an instrument panel that is in front of the passenger seat next to the driver's seat (hereinafter referred to as the "passenger seat"), and includes a folded airbag, an inflator which supplies inflation gas to the airbag, and a housing-forming member which surrounds and accommodates the folded airbag (e.g. see JP-A-2000-190798). The housing-forming member includes a case which accommodates the folded airbag and the inflator and an airbag cover which is to be pushed and opened by the airbag that is being inflated. The case is made of a sheet metal having the shape of a substantially rectangular body, and includes a bottom wall section which couples the airbag to the inflator and a cylindrical sidewall section which extends upward from the front, rear, right and left portions of the bottom wall section. The airbag cover is disposed at the circumference of the opening formed in the instrument panel to engage with the circumference of the opening in order to close the opening, and is also coupled to the case using engagement protrusions provided on the sidewall section of the case, in particular, front and rear regions of the sidewall section, or bolt members.

In addition, the airbag is folded so as to be accommodated in the case having substantially the shape of a rectangular case. The airbag is also folded such that a passenger side panel section which forms the outer circumferential wall of the airbag is placed on a vehicle side panel section, the airbag is deployed flat, and both the lateral size and the front-to-back size of the airbag are reduced.

However, in the passenger seat airbag apparatus of the related art, the airbag is folded to a central side in the lateral direction such that the front-to-back size as well as the lateral size of the airbag is reduced from the state in which the airbag is deployed flat. Therefore, the height in the upward-downward direction of the airbag, i.e., the thickness of a folding completed body, is increased. The thickness in the upward-downward direction of the housing-forming member is also increased depending on the thickness of the folding completed body of the airbag.

Accordingly, it is difficult to mount the airbag apparatus in a region of the instrument panel where a upward-downward space is small, for example, a rear edge or a surrounding region of the instrument panel that forms an intersecting region of an upper wall section and a rear wall section of the instrument panel intersect.

Accordingly, in order to solve the above problems, an object of the present invention is to provide a passenger seat airbag apparatus which is easily mounted even if a upward-downward space is small.

SUMMARY (1) According to an aspect of the invention, a passenger seat airbag apparatus mounted in an upper side of an instrument panel in front of a passenger seat next to a driver's seat includes a folded airbag, an inflator that supplies an inflation gas into the airbag, and a housing-forming member that accommodates the folded airbag. The airbag includes an outer circumferential wall which has a passenger side panel section disposed at a passenger side when inflation of the airbag is completed and a vehicle body side panel section extending forward from the passenger side panel section, an inlet opening for the inflation gas which is positioned at a front lower side of the vehicle body side panel section, and a circumference of the inlet opening which forms an attachment region to which the housing-forming member is attached. The airbag is accommodated in the housing-forming member by forming an unfolded body in a flat deployed state by placing the passenger side panel section on the vehicle body side panel section under which the inlet opening is disposed, and then forming a folding completed body by folding the unfolded body through reduction folding that reduces an outer size of an outer circumference of the unfolded body to be close to the inlet opening so that the folding completed body is accommodated in the housing-forming member. The housing-forming member includes a ceiling-forming region which covers an upper side of the folding completed body of the airbag and has a door section which is to be pushed and opened by the airbag when the airbag is being inflated, and a housing body part which covers the folding completed body of the airbag at a lower side of the ceiling-forming region and includes a bottom wall-forming region to which the attachment region of the inflator and the airbag is attached, and sidewall-forming regions which are disposed between the bottom wall-forming region and the ceiling-forming region. The folding completed body of the airbag is folded through front-to-back reduction folding that reduces a size of the unfolded body in a front-to-back direction by restricting a reduction in a lateral size of the unfolded body so that length of the unfolded body in a lateral direction is greater than length of the unfolded body in the front-to-back direction, and at least a central region in a lateral direction becomes only a folded region of the front-to-back reduction folding. A distance from the ceiling-forming region to the bottom wall-forming region of the housing body part is set to correspond to a thickness of the folded region that has been folded through the front-to-back reduction folding such that the folded region that has been folded through the front-to-back reduction folding is accommodated in the central region of the folding completed body. The bottom wall-forming region is connected to the ceiling-forming region via the sidewall-forming regions so that the housing body region has a strength and does not break down by a pressure of the airbag when the airbag is being inflated.

(6) According to another aspect of the invention, a folded airbag to be used in a passenger seat airbag apparatus mounted in an upper side of an instrument panel in front of a passenger seat next to a driver's seat includes an outer circumferential wall which has a passenger side panel section disposed at a passenger side when inflation of the folded airbag is completed and a vehicle body side panel section extending forward from the passenger side panel section when the inflation of the folded airbag is completed, and an inlet opening for inflation gas which is positioned at a front lower side of the vehicle body side panel section when the inflation of the folded airbag is completed. The folded airbag is formed by (1) forming an unfolded body in a flat deployed state by placing the passenger side panel section on the vehicle body side panel section under which the inlet opening is disposed, (2) forming an intermediate folded body by folding the unfolded body through reduction folding that reduces an outer size of an outer circumference of the unfolded body to be close to the inlet opening, and (3) folding the intermediate folded body through front-to-back reduction folding that reduces a size of the intermediate folded body in a front-to-back direction and restricts a reduction in a lateral size of the intermediate folded body so that a length of the folded airbag in a lateral direction is greater than a length of the folded airbag in a front-to-back direction.

In the passenger seat airbag apparatus according to the present invention, the folding completed body of the airbag is folded by the front-to-back reduction folding that mainly reduces the front-to-back while restricting lateral reduction folding that reduces the lateral size, and is formed as only the central region in the lateral direction, i.e. the folded region that is formed by the front-to-back reduction folding that reduces the front-to-back size of the region around the inlet opening.

Therefore, although the folding completed body of the airbag tends to be thickest at the circumferential region of the inlet opening when the airbag is folded such that the outer circumference of the unfolded body becomes close to the inlet opening, the corresponding region, i.e. the central region in the lateral direction of the folding completed body, is formed as only the folded region that is produced by the front-to-back reduction folding. Accordingly, it is possible to reduce the thickness as small as possible.

In addition, since the distance from the ceiling-forming region to the bottom wall-forming region of the housing body part is set corresponding to the thickness of the folded portion produced by the front-to-back reduction folding so that the folded region in the central region of the folding completed body that is produced by the front-to-back reduction folding is accommodated, the thickness of the housing body part is reduced like the folding completed body.

Of course, although the housing body part is subjected to strong resistance from the airbag that is being inflated due to a decrease in the thickness, the bottom wall-forming region is connected to the ceiling-forming region using the sidewall-forming regions so that the strength of the housing body part can resist against the pressure of the airbag that is being inflated. It is therefore possible to accurately support the airbag that is being inflated, and consequently, the airbag can be deployed and inflated while properly opening the door section.

Therefore, in the passenger seat airbag apparatus according to the present invention, the thickness of the housing body part and the folded airbag can be reduced, and the upward-downward size can be reduced. Therefore, even if the upward-downward space of the mounting region at an upper side of the instrument panel is small, the airbag apparatus can be easily mounted.

In addition, in the passenger seat airbag apparatus according to the present invention, the airbag is folded in the state in which the lateral reduction folding that reduces the lateral size of the unfolded body is restricted. In other words, when the airbag is being deployed and inflated, the right and left folded regions are substantially unfolded. Therefore, even if the passenger is seated close to the instrument panel, the behavior of hitting the passenger due to unfolding of the right and left folded regions during the deployment and inflation of the airbag is restricted. The airbag can provide cushioned protection to the passenger in the laterally deployed state in which the airbag can restrict an application of partial pressing force.

(2) In the passenger seat airbag apparatus of (1), the sidewall-forming regions of the housing body part which connect the bottom wall-forming region and the ceiling-forming region to each other are disposed only at front and rear sides.

With the configuration (2), since the housing body part can be produced even if none of the sidewall-forming regions which connect the bottom wall-forming region and the ceiling-forming region to each other is disposed at either a right or left side. It is therefore possible to reduce weight and save resources.

(3) In the passenger seat airbag apparatus of (1) or (2), the housing body part has openings disposed at right and left sides, and the folding completed body of the airbag is accommodated in the housing-forming member in a state in which right and left ends of the folding completed body protrude from the openings of the housing body part.

With the configuration (3), it is possible to further reduce weight and save resources since the lateral size of the housing body part can be set shorter than that of the folding completed body of the airbag.

(4) In the passenger seat airbag apparatus of any one of (1) to (3), the folding completed body of the airbag is folded only through the front-to-back reduction folding.

(5) In the passenger seat airbag apparatus of any one of (1) to (4), the folding completed body of the airbag comprises folded regions that are produced through lateral reduction folding at right and left end sides, the folded regions causing lateral edges of the unfolded body to be close to the inlet opening, within a range of thickness that is smaller than a thickness of the central region in the lateral direction.

With the configurations (4) and (5), while the airbag 10 is being deployed and inflated, none of the right and left folded regions is unfolded, and the behavior of hitting the passenger due to unfolding of the right and left folded regions is completely removed. Therefore, even if the passenger is approaching the instrument panel, the airbag that is being deployed and inflated can efficiently provide protection to the passenger in the state of being spread widely in the lateral direction without being partially pressed.

In addition, in the folding completed body of the airbag, although the lateral size is increased, the thickness can be reduced over the entire lateral area, and the thickness of the corresponding housing body part can also be reduced. Therefore, it is possible to mount the airbag apparatus in the mounting region that has the small upward-downward space.

Of course, in the passenger seat airbag apparatus according to the present invention, the folding completed body of the airbag may include the folded regions at right end left end sides that are produced by the lateral reduction folding, in which the folded regions cause the lateral edges of the unfolded body to be close to the inlet opening, within the range in which the thickness is not increased, for example, the range of thickness that is smaller than the thickness of the central region in the lateral direction.

BRIEF DESCRIPTION OF THE DRAWINGS

FIGS. 9A to 9C are views illustrating the folding of the airbag according to the first embodiment, showing the process subsequent to FIGS. 8A and 8B;

FIGS. 12A and 12B are views illustrating a modified embodiment of a folding completed body of the airbag according to the first embodiment;

FIG. 19 is a schematic vertical cross-sectional view taken along a lateral direction of a vehicle, showing the state of use of a passenger seat airbag apparatus according to a fourth embodiment;

DESCRIPTION OF PREFERRED EMBODIMENT

Figure 1:
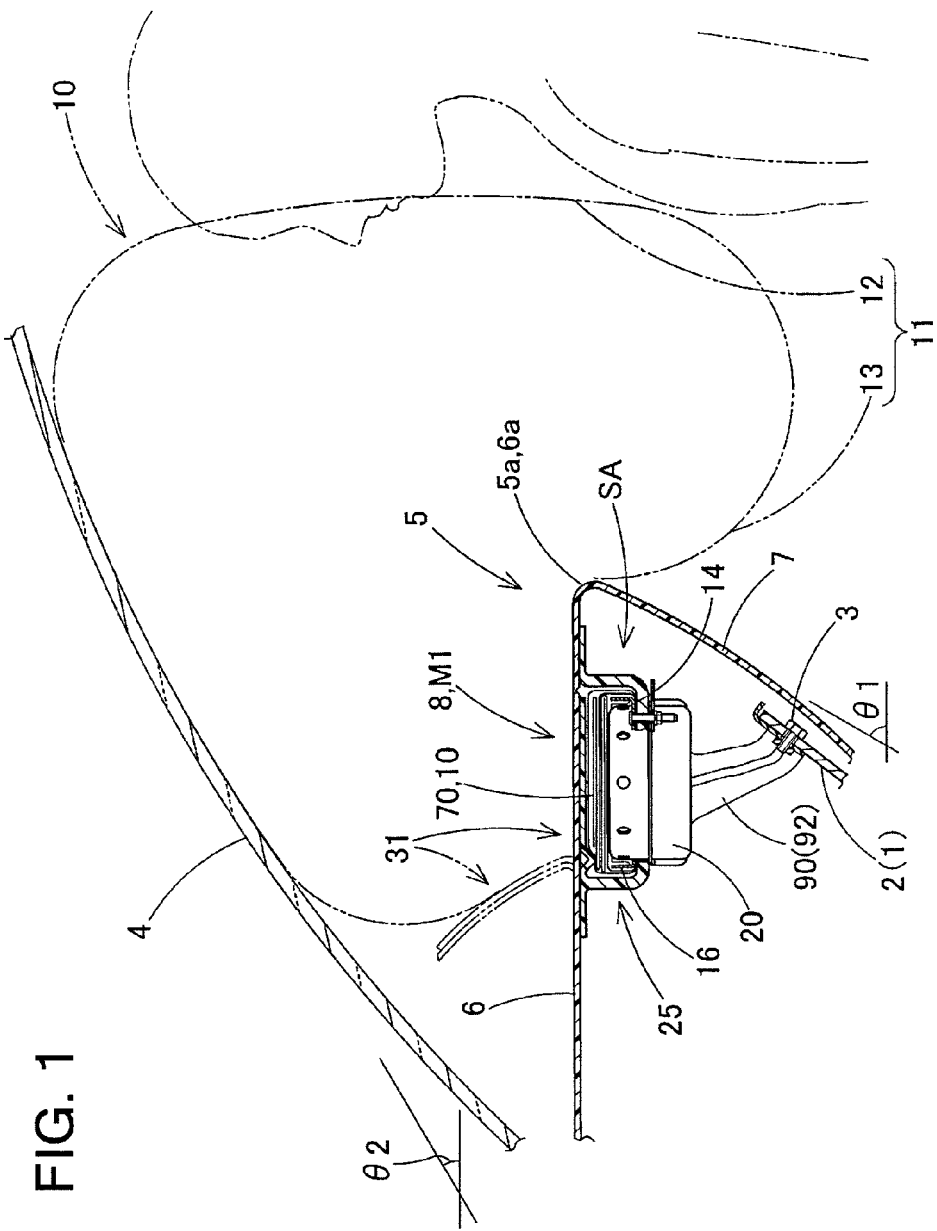
FIG. 1 is a schematic vertical cross-sectional view taken along the front-to-back direction of a vehicle, showing the state of use of a passenger seat airbag apparatus according to a first embodiment of the present invention.
Figure 2:
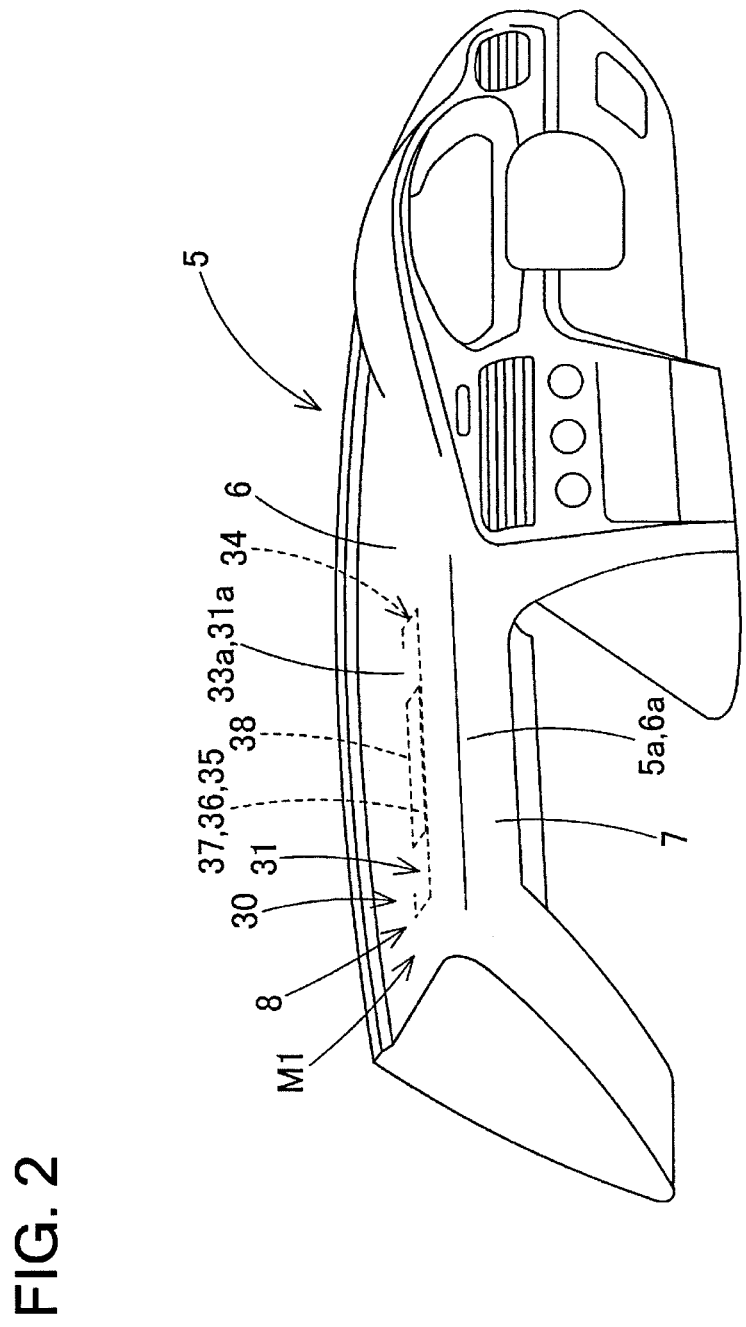
FIG. 2 is a perspective view of an instrument panel in which the passenger seat airbag apparatus according to the first embodiment is disposed.

A first embodiment of the present invention will now be described with reference to the accompanying drawings. As shown in FIG. 1 to FIG. 4, a passenger seat airbag apparatus M1 according to the first embodiment is disposed in a mounting region 8 in an upper side of an instrument panel 5 in front of the passenger seat. The airbag apparatus M1 includes a folded airbag 10, an inflator 20 which supplies inflation gas to the airbag 10, and a housing-forming member 25 which accommodates the folded airbag 10 by surrounding the airbag 10.

The mounting region 8 for the instrument panel 5 is adjacent to a rear edge 6a of an upper wall section 6 that is an upper side of the instrument panel 5, i.e. adjacent to an intersecting region 5a where the upper wall section 6 of the instrument panel 5 which is disposed substantially horizontal intersects a rear wall section 7 which extends obliquely forward and downward from the rear edge 6a of the upper wall section 6. Since the rear wall section 7 which extends forward and downward is disposed below, the mounting region 8 has a small space SA in the upward-downward direction.

In addition, compared to the case of a typical instrument panel, in the instrument panel 5 according to this embodiment, the angle of forward downward inclination θ1 of the rear wall section 7 is small such that the angle of the intersecting region 5a where the upper wall section 6 and the rear wall section 7 intersect becomes small. Furthermore, the angle of rearward upward inclination θ2 of a front windshield 4 is set small such that the front windshield approaches the upper wall section 6. Therefore, the airbag apparatus M1 is disposed at a side of a rear edge 6a of the upper wall section 6. This can reduce the interference of a door section 31 of the housing-forming member 25 which is to be pushed and opened by the airbag 10 which will be described later with the windshield 4 when the door section 31 is opened forward. Consequently, the airbag apparatus M1 according to this embodiment is mounted in the mounting region 8 that is an area where the upward-downward space SA is small.

In the meantime, the instrument panel 5 is made of a synthetic resin such as polypropylene. According to this embodiment, a portion of the upper wall section 6 forms an outer panel section 33 at an outer surface side of a ceiling-forming region 30 of the housing-forming member 25 which will be described later.

Figure 7:
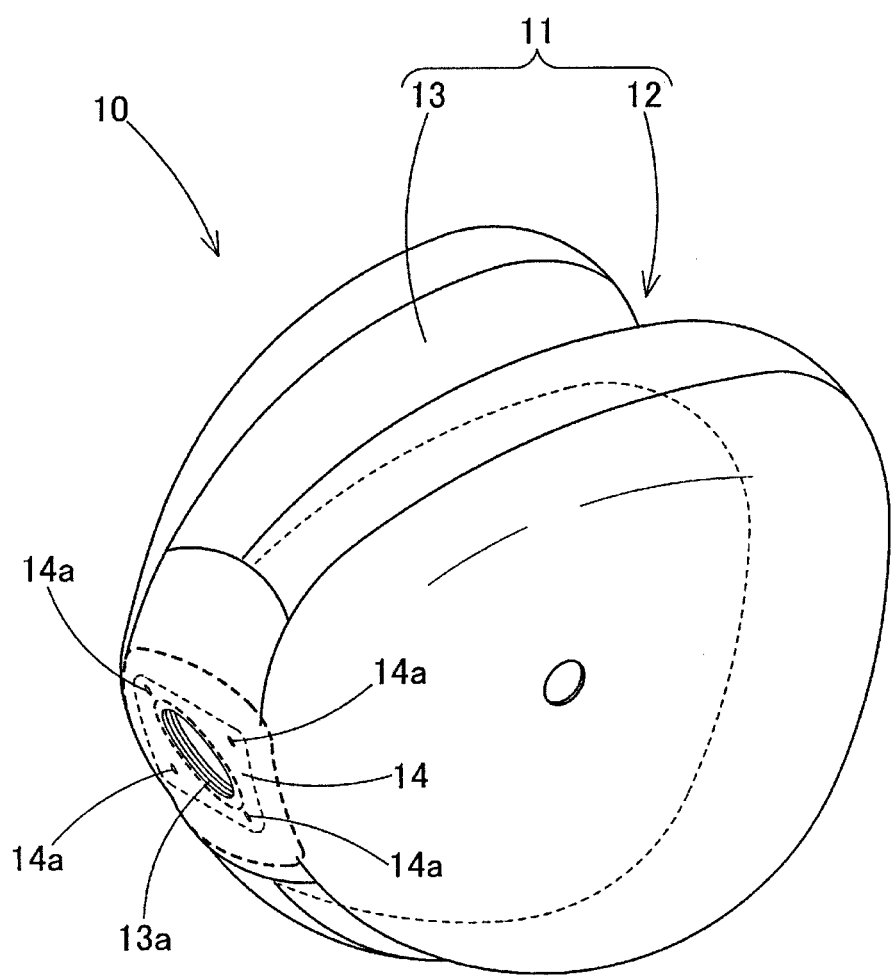
FIG. 7 is a schematic perspective view of the airbag according to the first embodiment which is inflated into a unitary body.

As shown in FIG. 1 and FIG. 7, the airbag 10 includes outside walls 11 that form substantially the shape of a rectangular pendulum when inflation is completed. The outside walls 11 are made of flexible woven cloth such as polyamide, and include a passenger side panel section 12 which is disposed at a passenger side when inflation is completed and a vehicle body side panel section 13 which is taped forward from the passenger side panel section 12 so as to extend into the shape of a rectangular pendulum.

Figure 3:
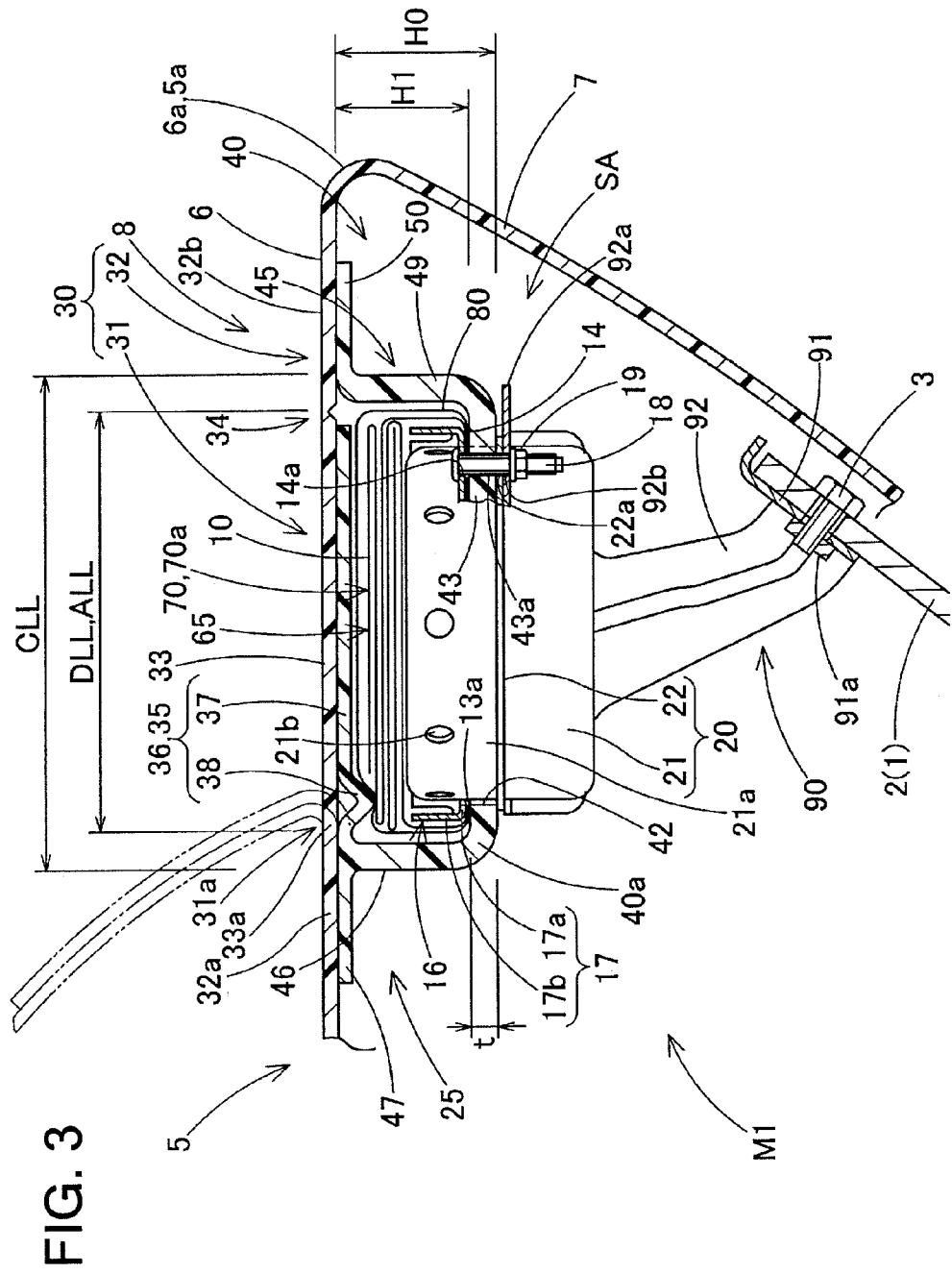
FIG. 3 is an enlarged schematic vertical cross-sectional view taken along the front-to-back direction of a vehicle, showing the state of use of the passenger seat airbag apparatus according to the first embodiment.
Figure 4:
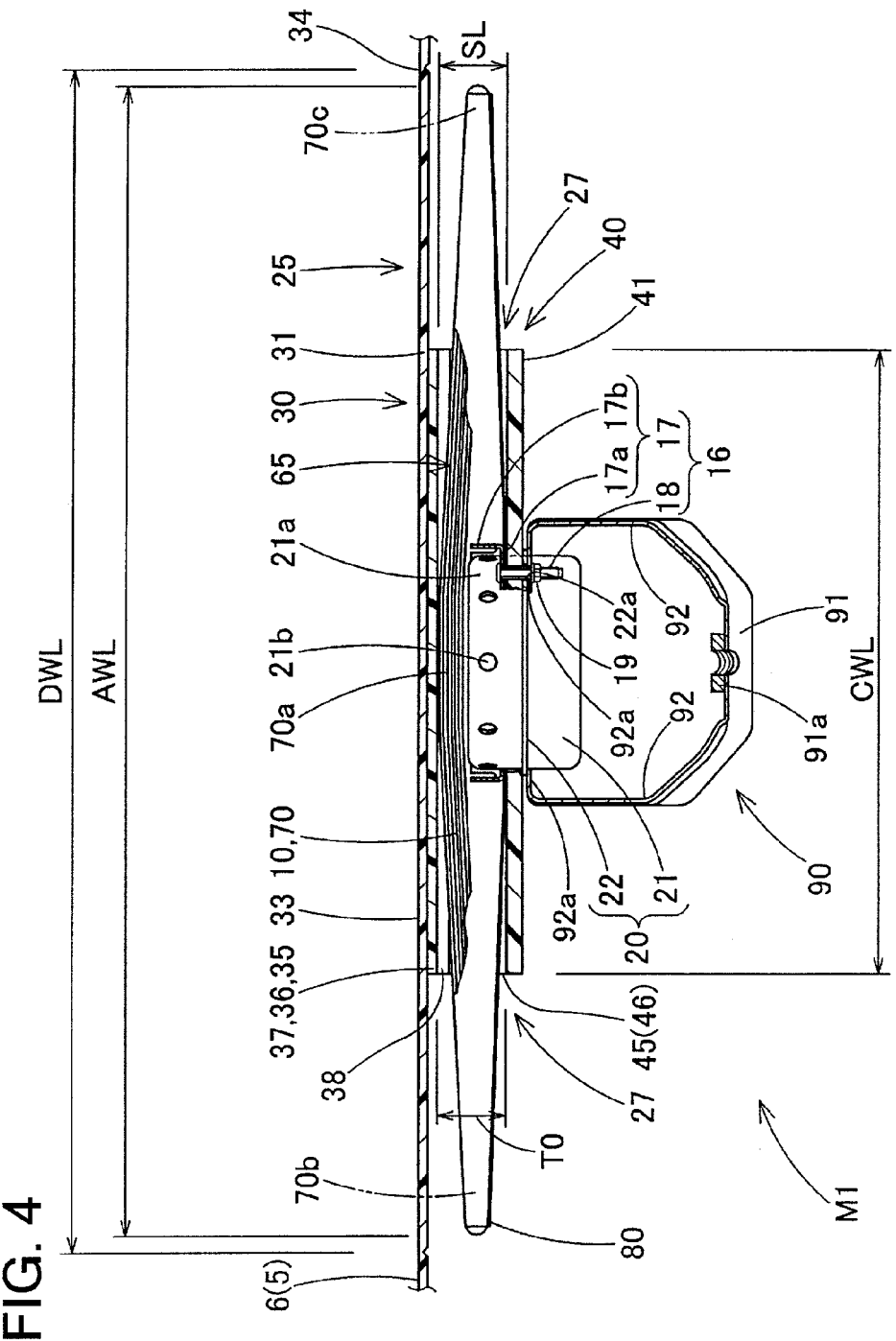
FIG. 4 is a schematic vertical cross-sectional view taken along the lateral direction of the vehicle, showing the state of use of the passenger seat airbag apparatus according to the first embodiment.

As shown in FIG. 3, FIG. 4 and FIG. 7, the airbag 10 has an inflation gas inlet opening 13a which is formed at a lower front side of the vehicle body side panel section 13, and the circumference of the inflation gas inlet opening 13a forms an attachment region 14 to which the housing-forming member 25 is attached. Four attachment holes 14a are formed in the attachment region 14.

The retainer 16 includes a substantially rectangular ring-shaped body 7 which is made of a sheet metal and four bolts 18 attached to the body 7. The body 17 includes a rectangular ring-shaped bottom wall section 17a and vertical wall sections 17b which extend upward from the outer circumference of the bottom wall section 17a, and is disposed on the attachment region 14 inside the airbag 10. The bolts 18 protrude and extend downward from four corner portions of the bottom wall section 17a. The respective bolts 18 protrude through the attachment holes Ma from the body 17 which is disposed inside the airbag 10. These bolts 18 attach the airbag 10 and the inflator 20 to the housing-forming member 25 while coupling the housing-forming member 25 and an attachment bracket 90 with each other.

In the meantime, as shown in FIG. 3 to FIG. 6, the attachment bracket 90 attaches the airbag apparatus M1 to a bracket 2 extending from an instrument panel reinforce 1. The attachment bracket 90 includes a fixed piece section 91 which is made of a sheet metal and fixed to the bracket 2 using a bolt 3 and two support rod sections 92 which extend upward from right and left edges of the fixed piece section 91. When viewed in the front-to-back direction, the attachment bracket 90 is U-shaped. A nut 91a which fits around the bolt 3 is fixed to the fixed piece section 91, and support seats 92a are respectively formed on the upper ends of the support rods 92. The support seats 92a have the shape of a belt extending in the front-to-back direction and abut to right and left lower sides of a flange section 22 of the inflator 20 which will be described later to support the airbag apparatus M1. The support seats 92a respectively have through-holes 92b which are formed in the front-to-back direction to be parallel to each other, and into which the bolts 18 of the retainer 16 are fitted.

The inflator 20 includes a body section 21 having a plurality of gas discharge ports 21b which discharge inflation gas toward an upper portion 21a and the flange section 22 which protrudes from the outer circumference of the body section 21. The flange section 22 has attachment holes 22a into which the bolts 18 of the retainer 16 are respectively fitted. The inlet opening 13a of the airbag 10, an opening in the center portion of the bottom wall section 17a of the retainer 16 or an opening 42 in a bottom wall-forming region 41 of the housing-forming member 25 which will be described later has an inner diameter into which the body section 21 can be fitted. The upper portion 21a of the body section 21 above the flange section 22 is inserted into the folded airbag 10 through the opening 42 of the bottom wall-forming region 41, the inlet opening 13a and the opening in the center portion of the bottom wall section 17a of the retainer 16.

As shown in FIG. 3 to FIG. 6, the housing-forming member 25 includes the ceiling-forming region 30 which has the door section 31 which is to be pushed and opened by the airbag 10 that is being inflated and covers a folding completed body 70 of the folded airbag 10 from above and a housing body part 40 which covers the folding completed body 70 of the airbag 10 from below the ceiling-forming region 30. The housing body part 40 includes the bottom wall-forming region 41 to which the inflator 20 and the attachment region 14 of the airbag 10 are attached and sidewall-forming regions 45 which are disposed between the bottom wall-forming region 41 and the ceiling-forming region 30.

The ceiling-forming region 30 includes the door section 31 which extends in the lateral direction to form substantially the shape of a rectangular plate and a circumferential region 32 surrounding the door section 31. The door section 31 has a hinge section 31a at a front edge such that the door section can be pushed and opened forward by the airbag 10 that is being inflated. Front and rear regions of the circumferential region 32 with respect to the door section 31 are coupling regions 32a and 32b to which the upper ends of the sidewall-forming regions 45 are coupled.

In addition, according to this embodiment, the ceiling-forming region 30 has a two-layer structure including the outer panel section 33 which forms an outer surface side and an inner panel section 35 which is disposed at a lower side of the outer panel section 33.

The outer panel section 33 has a thin tearing section (tear line) 34 which is supposed to be torn. The tearing section 34 is provided at a lower side of the outer circumference of the door section 31 in the outer panel section 33 which is formed as the upper wall section 6 of the instrument panel 5. The tearing section 34 is supposed to be pushed and torn by the airbag 10 that is being inflated. The tearing section 34 is formed as a continuous recess or intermittent recesses which are provided in a lower side of the outer panel section 33, and has the shape of a U that is elongated in the horizontal direction when viewed from above (see FIG. 2). In addition, a region of the outer panel section 33 where the tearing section 34 of the front edge of the door section 31 is not formed is a connecting section 33a which connects the door section 31 to the surrounding circumferential region 32, and also acts as the hinge section 31a.

The inner panel section 35 is formed as a door support section 36 which supports the outer panel section 33 in the door section 31 from a bottom side. The door support section 36 includes a door-coupling section 37 which has the shape of a rectangular plate, and the entire surface of which is coupled to a rear side of the outer panel section 33, and a bending-deformable hinge section 38 which is disposed at a region where the door-coupling section 37 is connected to the sidewall-forming regions 45. The door-coupling section 37 has the shape of a rectangular plate which extends in the lateral direction, and is fused to the outer panel section 33. The hinge section 38 has a shape, the cross-section of which can be bent into the shape of a V. The hinge section 38 is formed at a front edge of the door-coupling section 37, and forms the hinge section 31a of the door section 31 together with the connecting section 33a.

As shown in FIG. 3 to FIG. 6, according to the first embodiment, a lateral width DWL of the door section 31 formed as the outer panel section 33 and the tearing section 34 is set to be equal to or slightly greater than a lateral width AWL of the folding completed body 70 of the folded airbag 10. A front-ward-rearward width DLL of the door section 31 and the tearing section 34 is set to be equal to or slightly greater than a front-to-back width ALL of the folding completed body 70 of the folded airbag 10.

In the meantime, the lateral width CWL of the door support section 36 formed as the inner panel section 35 is shorter than the folding completed body 70 to be about half of the lateral width AWL of the folding completed body 70 of the folded airbag 10.

The bottom wall-forming region 41 of the housing body part 40 has the shape of a rectangular plate which extends in the lateral direction, and has a circular opening 42 in the middle of the lateral direction into which the body section 21 of the inflator 20 can be inserted from below. The circumference of the opening 42 is an attachment region 43 to which the airbag 10 or the inflator 20 is attached, and has attachment holes 43a into which the bolts 18 of the retainer 16 are fitted.

The sidewall-forming regions 45 of the housing body part 40 include a front plate section 46 and a rear plate section 49 which extend from front and rear edges of the bottom wall-forming region 41, and has rectangular openings 27 in right and left portions. Coupling collar sections 47 and 50 extend outward, i.e. forward and rearward, from the upper end of the front and rear plate sections 46 and 49. The coupling collar sections 47 and 50 are respectively fused and coupled to the coupling regions 32a and 32b of the circumferential region 32 of the ceiling-forming region 30. The hinge section 38 of the door support section 36 is connected to a rear side of the upper end of the front plate section 46.

In addition, according to the first embodiment, while a front-to-back width CLL of the housing body part 40 except for the coupling collar sections 47 and 50 is set greater than a front-to-back width ALL of the folding completed body 70 of the airbag 10 such that the airbag 10 can be accommodated, the lateral width CWL as well as the door support section 36 is set shorter than the folding completed body 70 to be about half of the lateral width AWL of the folding completed body 70.

Therefore, left and right end portions 70b and 70c of the folding completed body 70 protrude in the lateral direction from right and left openings 27 and 27 of the housing body part 40.

In the meantime, according to the first embodiment, the housing body part 40 and the door support section 36 are made of a molded product 55 for a housing which is integrally molded from a synthetic resin such as polyolefin-based thermoplastic elastomer. The molded product 55 for a housing is made of a synthetic resin material having a deformable physical characteristic such that a front intersection region 40a where the front plate section 46 and the bottom wall-forming region 41 intersect can be restored to the original state after being expanded during assembly of the airbag apparatus M1.

In addition, the distance SL from the ceiling-forming region 30 to the bottom wall-forming region 41 of the housing body part 40 is set corresponding to the thickness T0 of a folded region 65 which is produced through the front-to-back reduction folding such that the housing body part 40 can accommodate the folded region 65 produced through the front-to-back reduction folding in a central region 70a of the folding completed body 70. Furthermore, the distance SL is set such that the folded region 65 can be properly accommodated in the housing body part 40 even if the upper portion 21a of the body section 21 of the inflator 20 is inserted into the housing body part 40 from below. A height H1 of the sidewall-forming regions 45 is set corresponding to the distance SL.

In addition, the bottom wall-forming region 41 of the housing body part 40 is connected to the ceiling-forming region 30 via the sidewall-forming regions 45 such that the strength of the housing body part 40 can resist against the pressure of the airbag 10 that is being inflated. According to this embodiment, the front plate section 46 and the rear plate section 49 of the sidewall-forming regions 45 are connected to the bottom wall-forming region 41 in which lower edges of the front and rear plate sections 46 and 49 are formed integrally with the bottom wall-forming region 41. The collar sections 47 and 50 at the upper ends are connected via fusion to the front and rear coupling regions 32a and 32b of the circumferential region 32 of the ceiling-forming region 30. In addition, the bottom wall-forming region 41, the front plate section 46 or the rear plate section 49 itself is configured to have a preset thickness t such that a rigidity (strength) can resist against the pressure of the airbag 10 that is being inflated.

Figure 5:
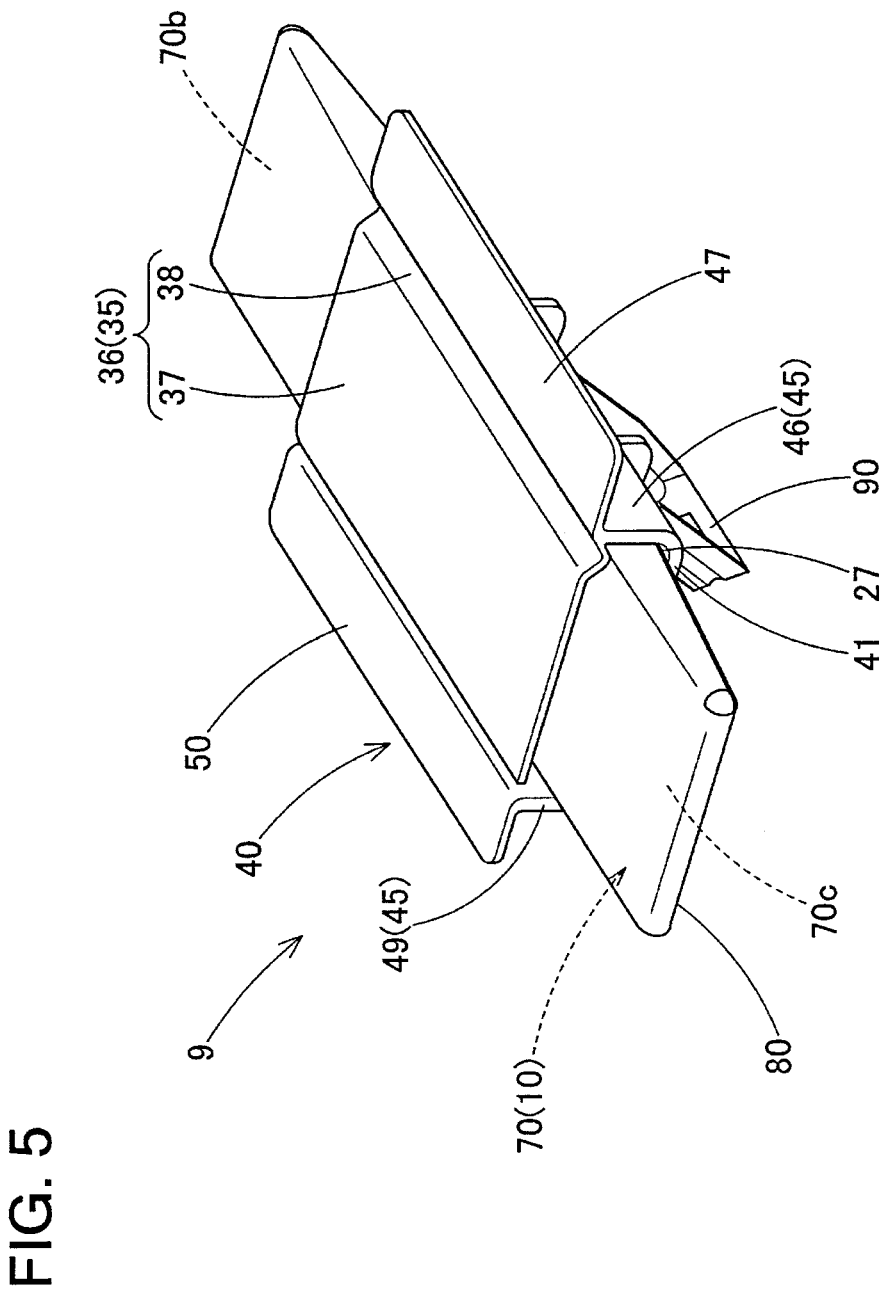
FIG. 5 is a schematic top perspective view of a body of the airbag apparatus according to the first embodiment.
Figure 6:
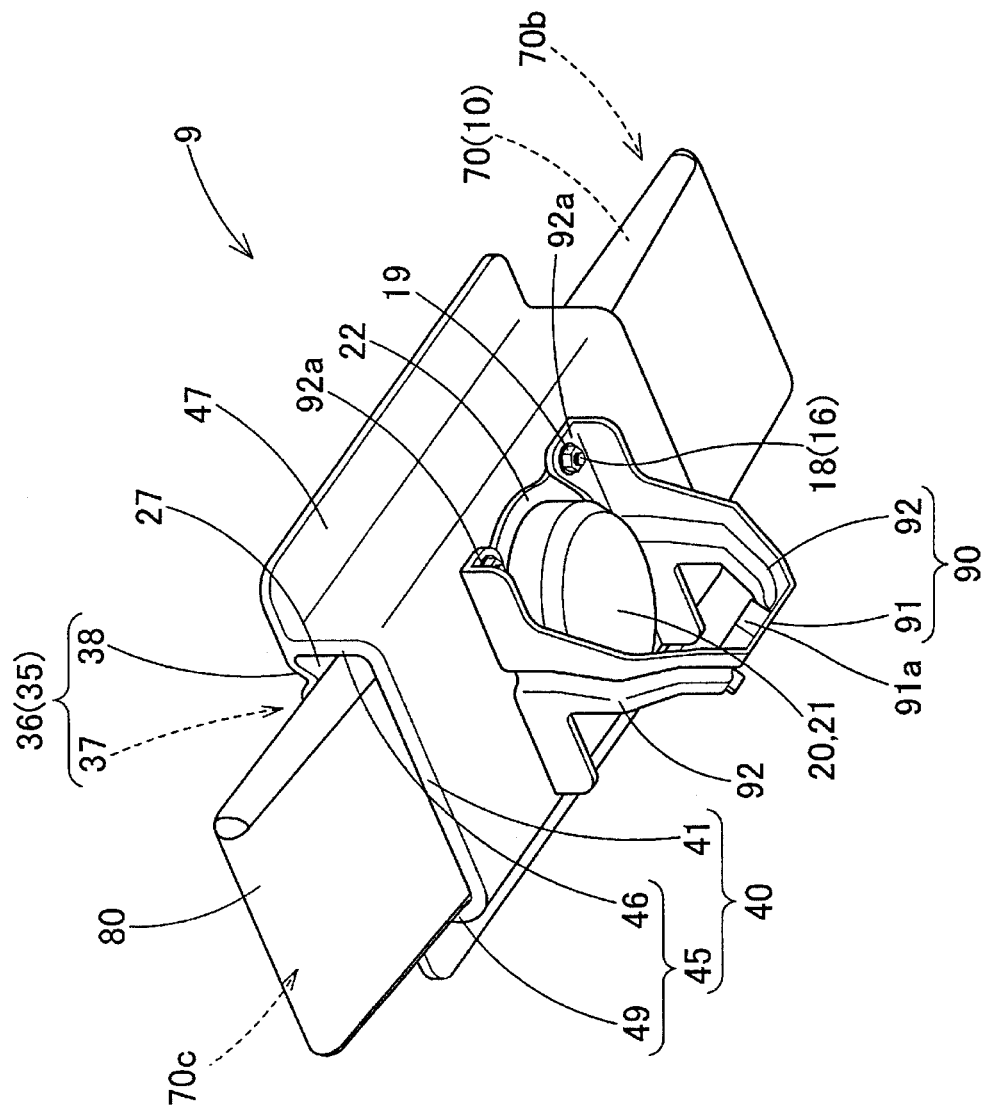
FIG. 6 is a schematic bottom perspective view of the body the airbag apparatus according to the first embodiment.

In addition, in the passenger seat airbag apparatus M1 according to the first embodiment, the regions except for the component region formed as the instrument panel 5, i.e. the regions of the ceiling-forming region 30 except for the outer panel section 33 formed as the upper wall section 6, may be referred to as an airbag apparatus body 9. Then, as shown in FIG. 5 and FIG. 6, the airbag apparatus body 9 includes the door support section 36 and the housing body part 40 of the molded product 55 for a housing, the airbag 10, the retainer 16 and the inflator 20.

A description will be given below to the process of assembling and mounting the airbag apparatus M1 in the mounting region 8. In the assembling process, first, the airbag 10 is folded.

Figure 8A:
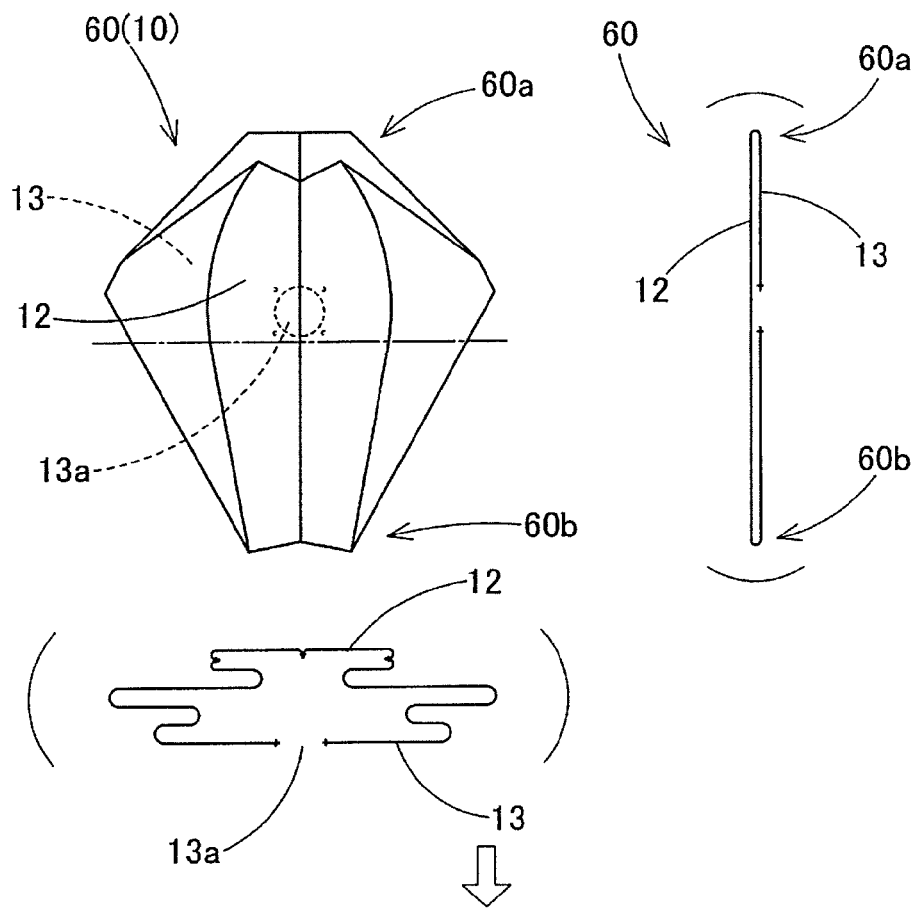
FIGS. 8A and 8B are views illustrating folding of the airbag according to the first embodiment.

In the folding the airbag 10, first, as shown in FIG. 8A, an unfolded body 60 is prepared. In the unfolded body 60, the passenger side panel section 12 is placed and deployed flat on the vehicle body side panel section 13 which is deployed such that the inlet opening 13a is directed downward so that the passenger side panel section 12 can be widely deployed and move rearward when the airbag 10 is inflated. The unfolded body 60 is symmetric in the lateral direction with respect to the inlet opening 13a, and is deployed flat by providing the passenger side panel section 12 or the vehicle body side panel section 13 with folding lines which cause the passenger side panel section 12 or the vehicle body side panel section 13 to properly approach the inlet opening 1a.

Afterwards, the airbag 10 is folded through reduction folding that reduces the outer size of the airbag 10 such that the outer circumference of the unfolded body 60 becomes similar to the inlet opening 13a so that the airbag 10 can be accommodated in the housing-forming member 25. According to the first embodiment, the airbag 10 is folded only through front-to-back reduction folding that reduces the size of the airbag 10 in the front-to-back direction.

Figure 8B:
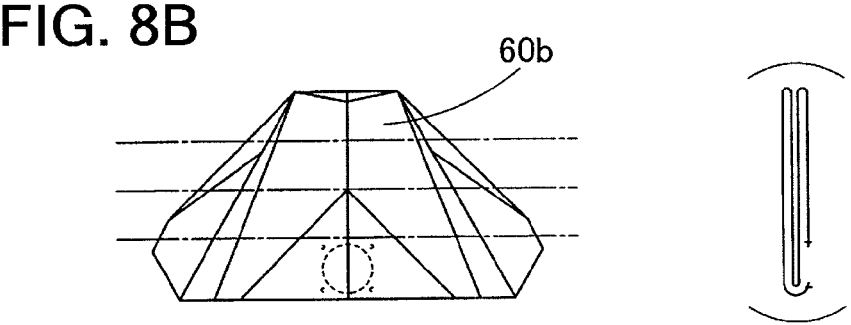
Figure 10A:
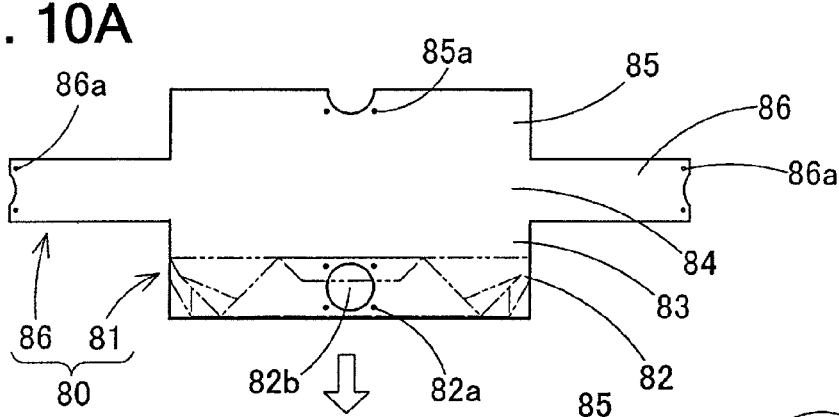
FIGS. 10A to 10D are views illustrating the process of winding a cover on the folded airbag according to the first embodiment.
Figure 10B:
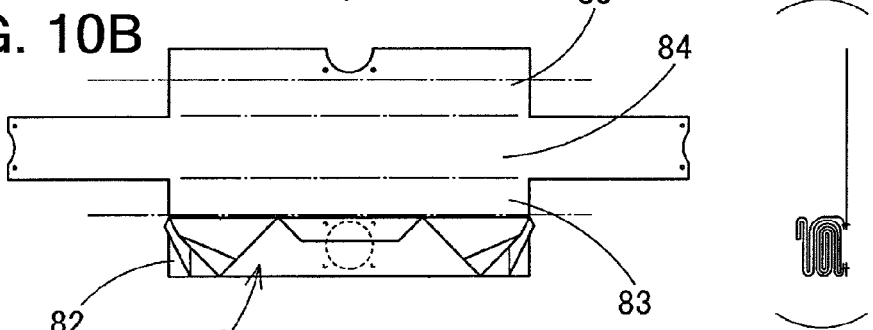
Figure 10C:
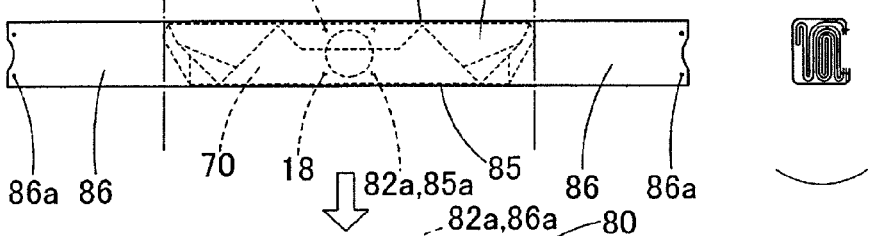
Figure 10D:
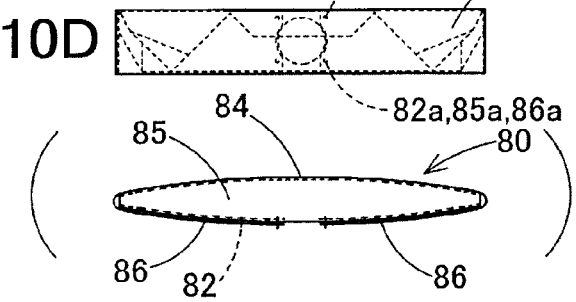

As shown in FIG. 8B and FIG. 9A, the front-to-back reduction folding according to this embodiment is roll folding in which a rear edge region 60b of the unfolded body 60 that is more rearward than the inlet opening 13a is wound on a side of the vehicle body side panel section 13. A folded region 60b produced by the roll folding is placed above the inlet opening 13a. Afterwards, as shown in FIGS. 9B and 9C, a front edge region 60a that is more forward than the inlet opening 13a is accordion-folded, and a folded region 62 is folded on the roll-folded region 61 in an overlapping fashion. When the folding is completed, the folding completed body 70 is produced.

The folding completed body 70 according to this embodiment is formed as the folded region 65 produced only through the front-to-back reduction folding. In the folded region 65, the thickness T0 of the central region 70a is greatest. As being spaced apart from the inlet opening 13a, the thickness of the left and right end portions 70b and 70c is smaller than the thickness of the central region 70a.

In the meantime, when folding the airbag 10, the retainer 16 is previously inserted into the airbag 10 by protruding the bolts 18 through the attachment holes 14a.

In addition, when the folding completed body 70 is produced, as shown in FIGS. 10A to 10D, the folding completed body 70 is covered with a cover material 80 which is made of a flexible sheet material such as nonwoven cloth in order to prevent unfolding and impurities from mixing into the folding lines of the folding completed body 70. The cover material 80 includes a rectangular belt-shaped section 81 which covers the front-to-back outer circumference of the folding completed body 70 and lateral cover sections 86 and 86 which extend in the lateral direction from the belt-shaped section 81.

The belt-shaped section 81 includes a bottom cover section 82 which is disposed at a side of the inlet opening 13a which forms a bottom side of the folding completed body 70, a ceiling cover section 84 which is disposed at a ceiling side of the folding completed body 70, and side cover sections 83 and 85 which are disposed at front and rear sides of the folding completed body 70. The bottom cover section 82 has an opening portion 82b at the center in the lateral direction which opens the inlet opening 13a and an engagement hole 82a through which each of the bolts 18 of the retainer 16 protrudes. The ceiling cover section 84 properly has slits (not shown) such that the ceiling cover section 84 can be easily torn when the airbag 10 is inflated. Engagement holes 85a and 86a are formed at leading end sides of the sidewall cover section 85 and the respective lateral cover sections 86 adjacent to end edges. With the engagement holes 85a and 86a, the cover material 80 maintains the wrapping state in which it covers and surrounds the folding completed body 70.

In addition, in the cover member 80, as shown in FIGS. 10A to 10D, the bottom cover section 82 of the belt-shaped section 81, the side cover section 83, the ceiling cover section 84 and the side cover section 85 are wound on forward-rearward outer circumferential portions of the folding completed body 70, and the rear bolts 18 and 18 are fitted into the respective engagement holes 85a of the side cover sections 85. Concurrently, the lateral cover sections 86 and 86 are folded toward the bottom surface of the folding completed body 70, and the bolts 18 are fitted into the respective engagement holes 86a. Then, the process of wrapping the folding completed body 70 can be completed.

Figure 11A:
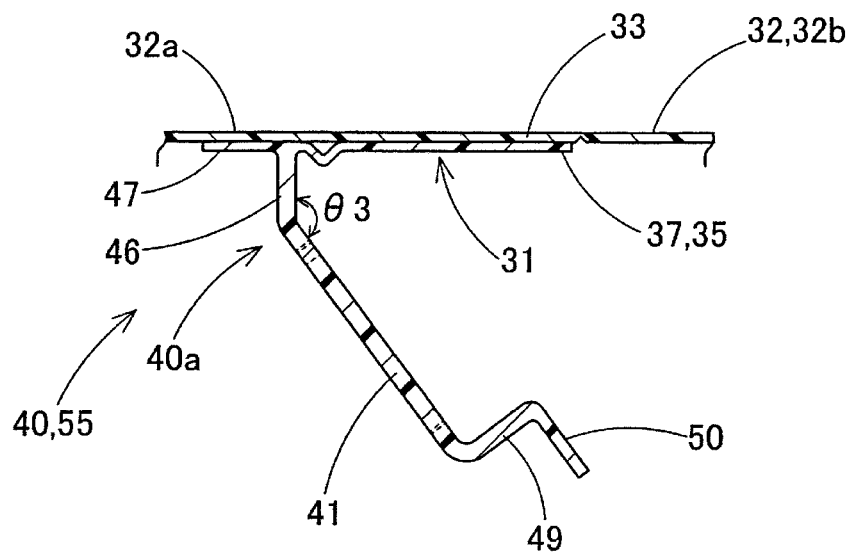
FIGS. 11A to 11C are views illustrating the process of assembling the airbag according to the first embodiment.

Afterwards, the folding completed body 70 wrapped in the cover material 80 is accommodated in the housing-forming member 25. At this time, as shown in FIG. 11A, the door-coupling section 37 of the door support section 36 in the molded product 55 for a housing is fused in advance to the outer panel section 33 in the door section 31 of the instrument panel 5 via ultrasonic fusion, vibration welding, or the like, and the collar coupling section 47 of the front plate section 46 is fused in advance to the front coupling region 32a of the circumferential region 32 of the instrument panel 5 via ultrasonic fusion, vibration welding, or the like.

Figure 11B:
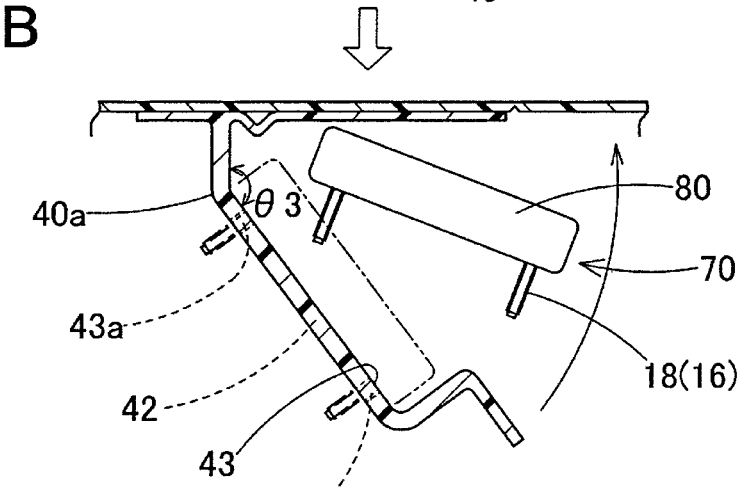
Figure 11C:
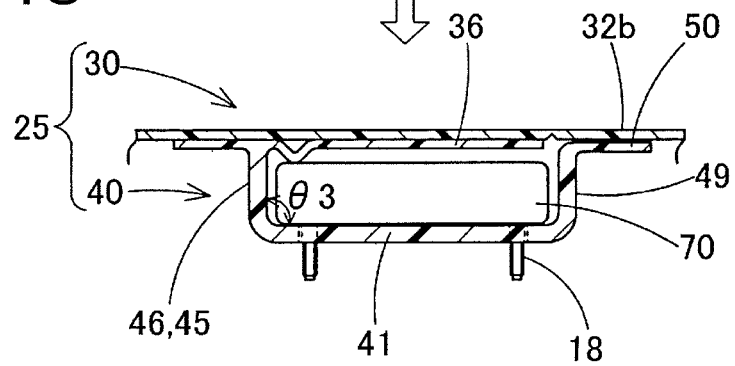

In addition, as shown in FIGS. 11B and 11C, an angle of intersection θ3 of the front intersection region 40a where the bottom wall-forming region 41 and the front plate section 46 of the housing body part 40 intersect is set to an expanded state, the respective bolts 18 are set to protrude downward from the attachment holes 43a, and the folding completed body 70 surrounding the cover material 80 is placed on the bottom wall-forming region 41. Afterwards, the coupling collar section 50 of the rear plate section 49 is abutted to the rear coupling region 32b of the circumferential region 32 by reducing the angle of intersection θ3 of the front intersection region 40a. When the coupling collar section 50 is fused to the coupling section 32b via ultrasonic fusion, vibration fusion, or the like, the housing-forming member 25 is produced while the folding completed body 70 is accommodated in the housing-forming member 25.

Afterwards, the upper portion 21a of the body section 21 of the inflator 20 is inserted into the folding completed body 70 accommodated in the housing-forming member 25 through the opening 42 of the bottom wall-forming region 41 while the bolts 18 protruding downward from the bottom wall-forming region 41 are being inserted into the attachment holes 22a of the flange section 22. In addition, the respective bolts 18 further protrude from the through-holes 92b, the support seats 92a of the right and left support rod sections 92 in the attachment bracket 90 are abutted to the flange section 22 of the inflator 20, and thus nuts 19 are respectively fitted around the bolts 18. Then, in the state in which the airbag apparatus M1 is mounted in the mounting region 8 of the instrument panel 5, it is possible to assemble the airbag apparatus M1 on which the attachment bracket 90 is mounted.

Afterwards, actuating leads (not shown) which extend from an airbag actuating circuit are connected to the inflator, an attachment portion (not shown) of the instrument panel 5 is fixedly attached to a preset portion of a vehicle. In addition, the fixed piece section 91 is fixed to the bracket 2 by abutting the fixed piece section 91 of the attachment bracket 90 to the bracket 2 which extends from the instrument panel reinforce 1 and fastening the bolt 3 into the nut of the fixed piece section 91. Consequently, the passenger seat airbag apparatus M1 can be mounted in the vehicle together with the instrument panel 5.

After the airbag apparatus M1 is mounted in the vehicle, when inflation gas is discharged from the gas discharge port 21b of the inflator 20, the airbag 10 is inflated and the tearing section 34 is torn, so that the door section 31 is turned and opened forward. The gas deploys and inflates the airbag 10 rearward through the opening formed by the opened door section 31, thereby completing inflation such that the airbag 10 can provide cushioned protection to the passenger.

In addition, in the passenger seat airbag apparatus M1 according to the first embodiment, the folding completed body 70 of the airbag 10 restricts lateral reduction folding that reduces the lateral size and is folded through front-to-back reduction folding. In addition, at least the central region 70a in the lateral direction, i.e. the region adjacent to the inlet opening 13a, is formed only of the folded region 65 by the front-to-back reduction folding that reduces the front-to-back size.

Therefore, although the folding completed body 70 of the airbag 10 tends to be thickest at the circumferential region of the inlet opening 13a when the airbag 10 is folded such that the outer circumference of the unfolded body 60 becomes close to the inlet opening 13a, the corresponding region, i.e. the central region in the lateral direction of the folding completed body 70, is formed as only the folded region 65 that is produced by the front-to-back reduction folding. Accordingly, it is possible to reduce the thickness T0 as small as possible.

In addition, the housing body part 40 is configured such that the housing body part 40 can accommodate the folded region 65 produced by the front-to-back reduction folding in the central region 70a of the folding completed body 70. The distance SL from the ceiling-forming region 30 to the bottom wall-forming region 41 is set corresponding to the thickness T0 of the folded region 65 produced by the front-to-back reduction folding, and the thickness (height) H0 of the housing body part 40 can be reduced like the folding completed body.

Of course, although the housing body part 40 is subjected to strong resistance from the airbag 10 that is being inflated due to a decrease in the thickness H0, the bottom wall-forming region 41 is connected to the ceiling-forming region 30 using the sidewall-forming regions 45 so that the strength of the housing body part 40 can resist against the pressure of the airbag 10 that is being inflated. It is therefore possible to accurately support the airbag 10 that is being inflated, and consequently, the airbag 10 can be deployed and inflated while properly opening the door section 31.

In the passenger seat airbag apparatus M1 according to the first embodiment, the thickness H0 of the housing body part 40 and the thickness T0 of the folded airbag 10 can be reduced, and the upward-downward size can be reduced. Therefore, even if the upward-downward space SA of the mounting region 8 at a side of the upper wall section 6 of the instrument panel 5 is small, the airbag apparatus can be easily mounted.

Furthermore, in the passenger seat airbag apparatus M1 according to the first embodiment, the airbag 10 is folded in the state in which the lateral reduction folding that reduces the lateral size of the unfolded body 60 is restricted. In other words, when the airbag 10 is being deployed and inflated, the right and left folded regions are substantially unfolded. Therefore, even if the passenger is seated close to the instrument panel 5, the behavior of hitting the passenger due to unfolding of the right and left folded regions during the deployment and inflation of the airbag 10 is restricted. The airbag 10 can provide cushioned protection to the passenger in the laterally deployed state in which the airbag 10 can restrict an application of partial pressing force.

In addition, in the passenger seat airbag apparatus M1 according to the first embodiment, the sidewall-forming regions 45 of the housing body part 40 which connects the bottom wall-forming region 41 to the ceiling-forming region 30 includes front plate section 46 and the rear plate section 49, which are disposed only at both front and rear sides.

Therefore, the first embodiment can be designed to reduce weight and save resources since the housing body part 40 can be produced even if none of the sidewall-forming regions which connect the bottom wall-forming region 41 and the ceiling-forming region 30 to each other is disposed at either a right or left side.

Furthermore, in the passenger seat airbag apparatus M1 according to the first embodiment, the openings 27 and 27 are disposed at right and left sides of the housing body part 40, and the folding completed body 70 of the airbag 10 are accommodated in the housing-forming member 25 with the left and right end portions 70b and 7c protruding from the openings 27 and 27 of the housing body part 40.

Therefore, the first embodiment can be designed to further reduce weight and save resources since the lateral width CWL of the housing body part 40 can be set shorter than the lateral width AWL of the folding completed body 70 of the airbag 10.

In addition, in the passenger seat airbag apparatus M1 according to the first embodiment, the folding completed body 70 of the airbag 10 is folded only by the front-to-back reduction folding.

Therefore, according to the first embodiment, while the airbag 10 is being deployed and inflated, none of the right and left folded regions is unfolded, and the behavior of hitting the passenger due to unfolding of the right and left folded regions is completely removed. Therefore, even if the passenger is approaching the instrument panel 5, the airbag 10 that is being deployed and inflated can efficiently provide protection to the passenger in the state of being spread widely in the lateral direction without being partially pressed.

Furthermore, the folding completed body 70 of the airbag 10 is folded only by the front-to-back reduction folding. Although the lateral width AWL is increased, the thickness T0 can be reduced over the entire lateral area, and the thickness H0 of the corresponding housing body part 40 can also be reduced. Therefore, it is possible to mount the airbag apparatus M1 in the mounting region 8 that has the small upward-downward space SA.

Figure 13:
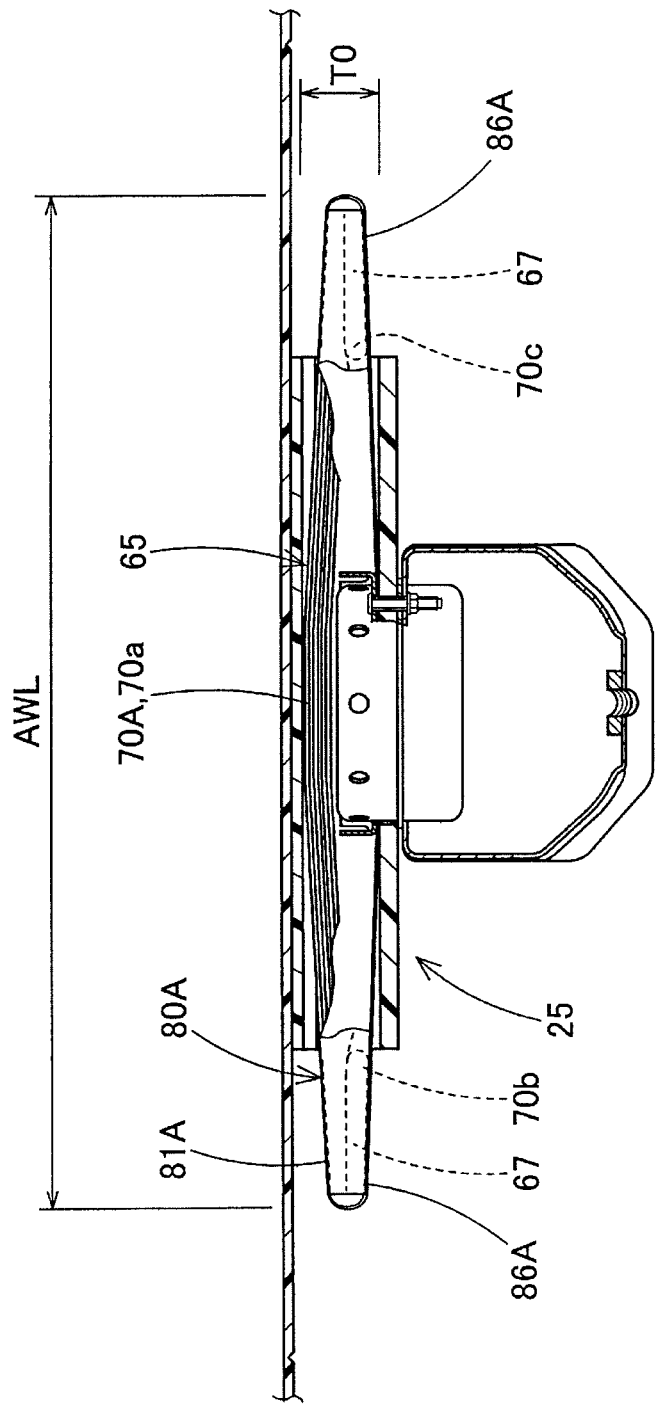
FIG. 13 is a schematic vertical cross-sectional view taken along the lateral direction of the vehicle in the airbag apparatus in which the folding completed body shown in FIG. 12B.
Figure 14:
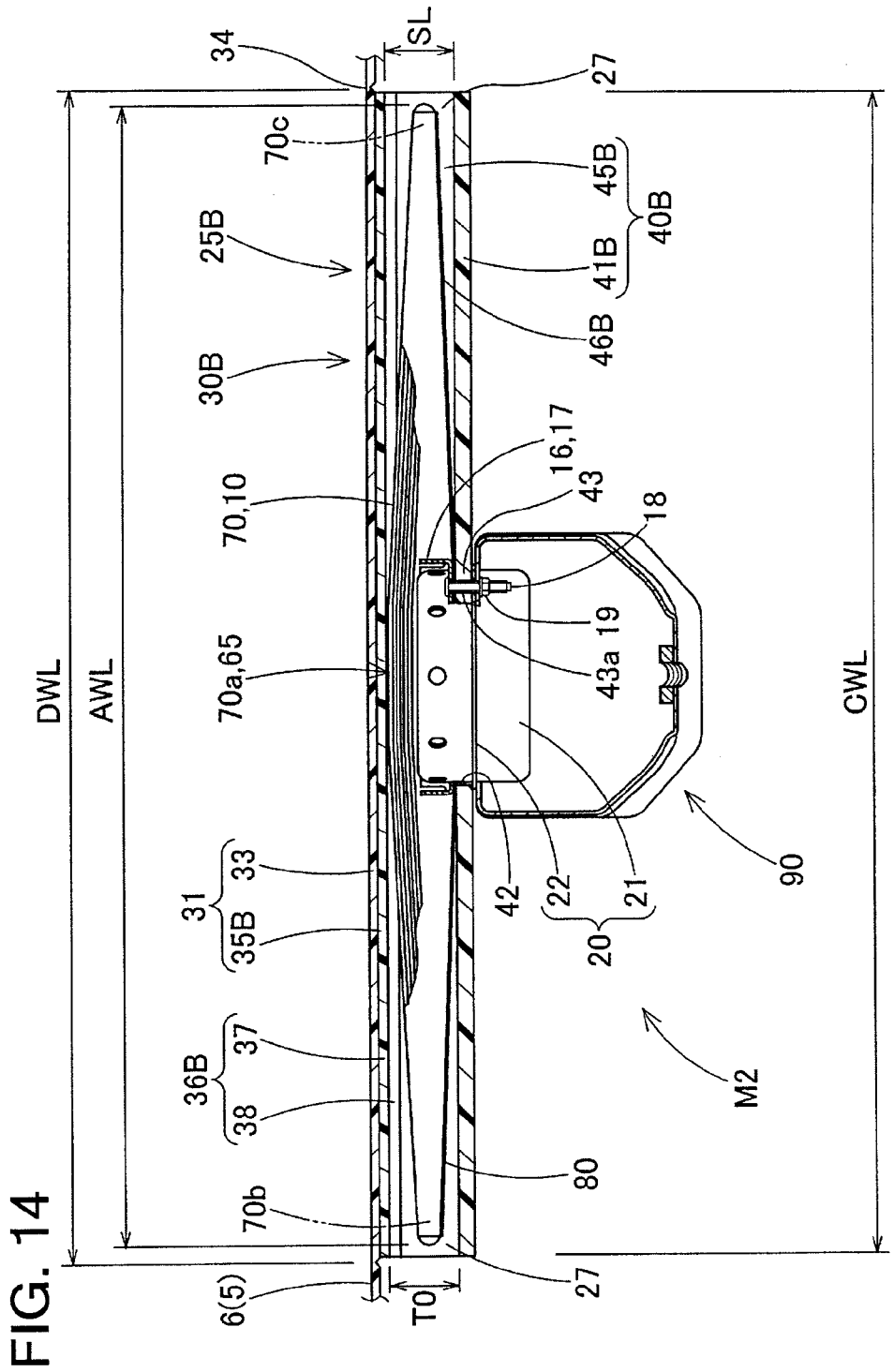
FIG. 14 is a schematic vertical cross-sectional view taken along a lateral direction of a vehicle, showing the state of use of a passenger seat airbag apparatus according to a second embodiment.
Figure 15:
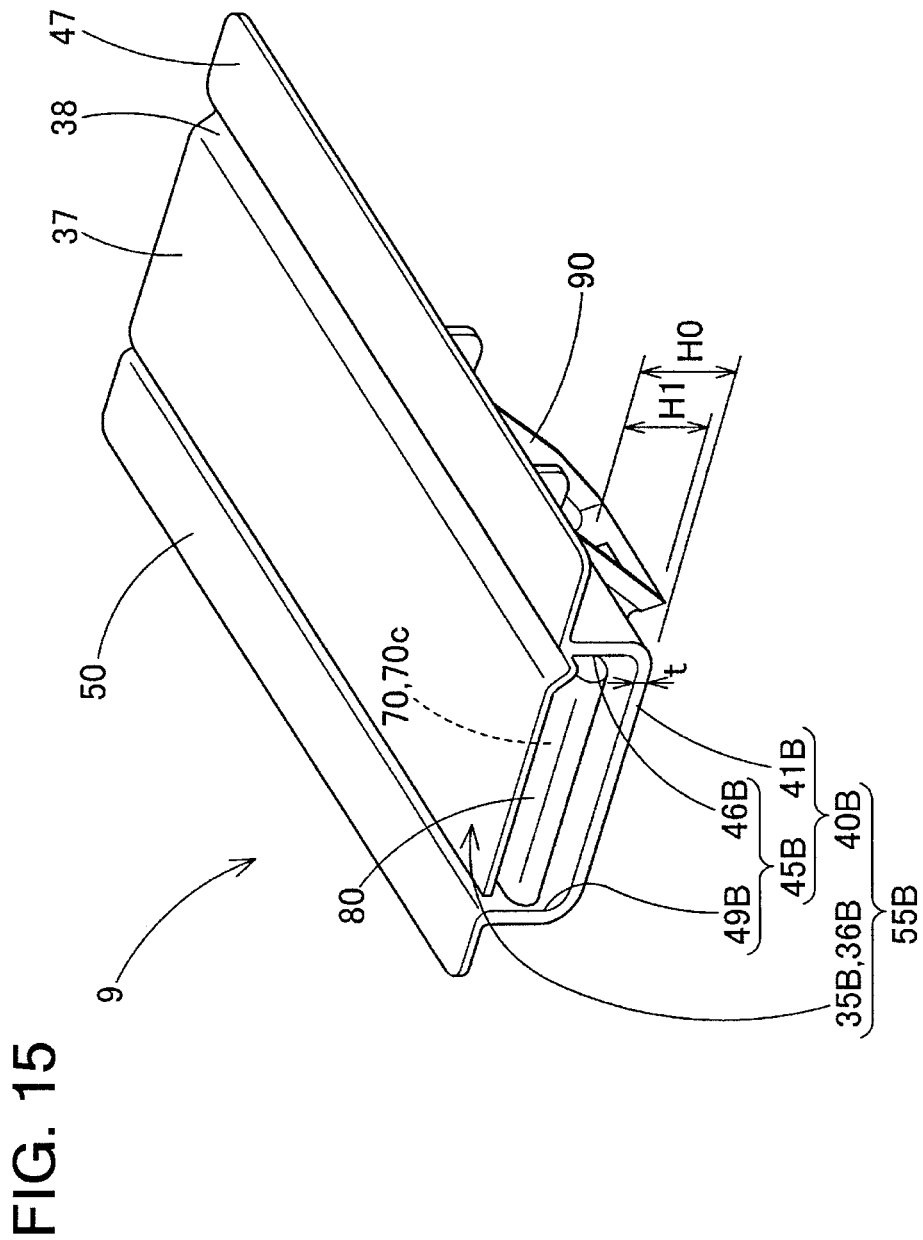
FIG. 15 is a schematic top perspective view of a body of the airbag apparatus according to the second embodiment.
Figure 16:
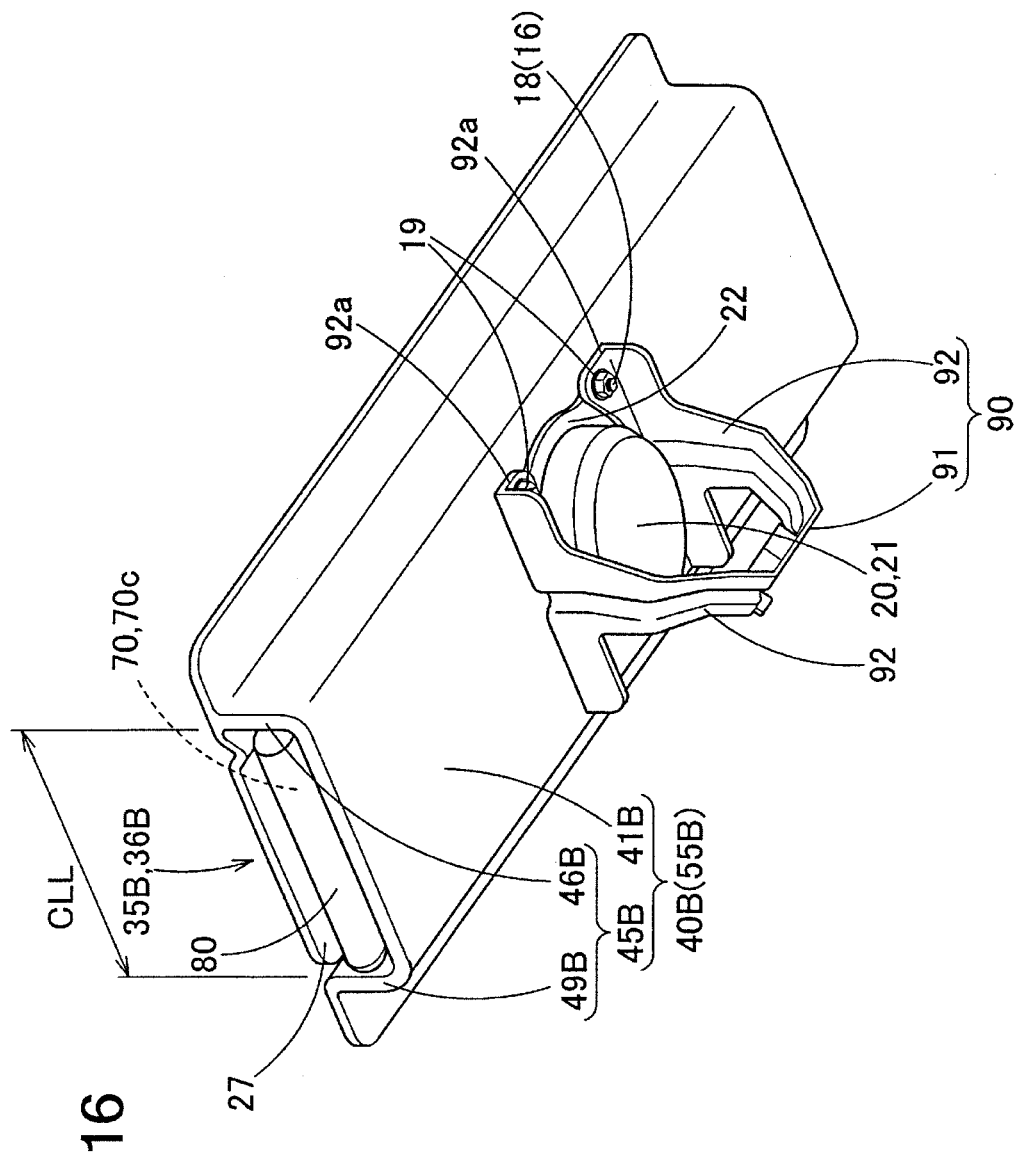
FIG. 16 is a schematic bottom perspective view of the body of the passenger seat airbag apparatus according to the second embodiment.
Figure 17:
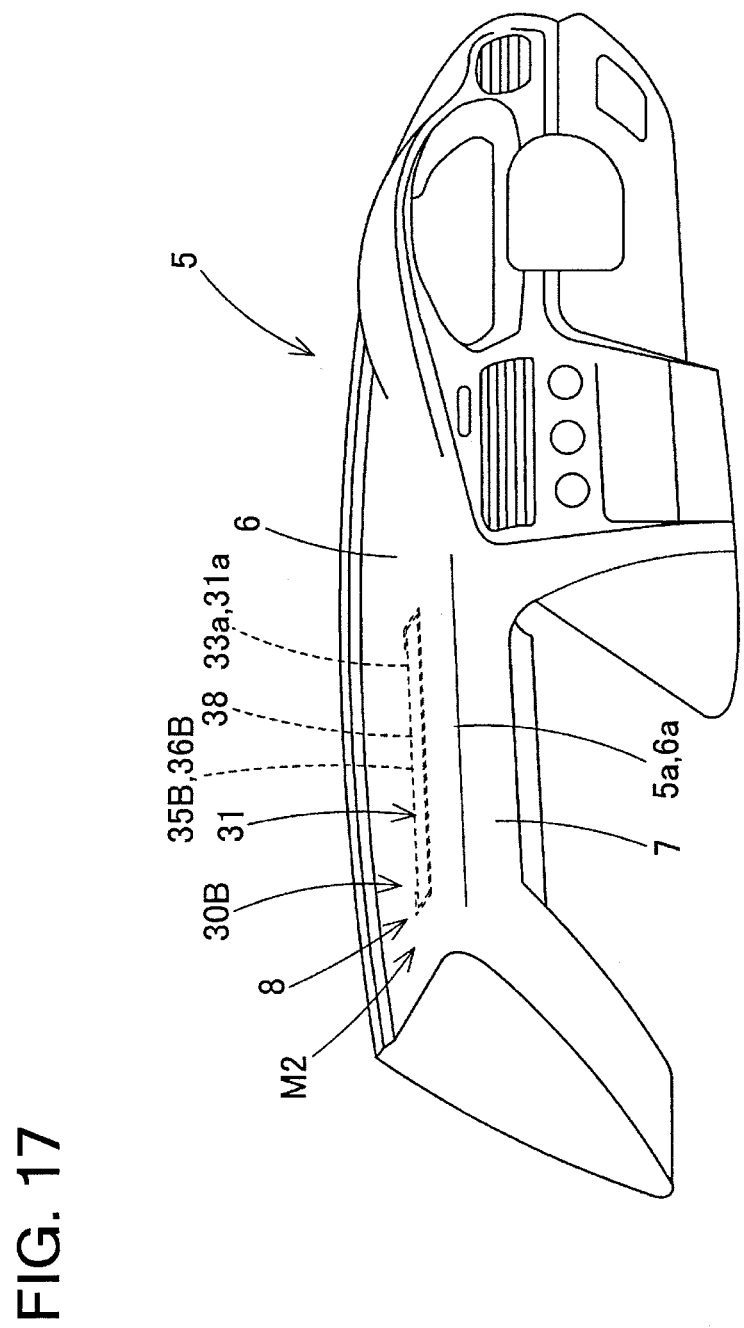
FIG. 17 is a perspective view of an instrument panel in which the passenger seat airbag apparatus according to the second embodiment is disposed.

In the meantime, the folding completed body of the airbag 10 may be implemented as a folding completed body 70A that has folded regions 67 and 67 that are produced by the lateral reduction folding at sides of the left and right end portions 70b and 70c within the range in which the thickness T0 is not increased, for example, as shown in FIG. 12A to FIG. 13, the range of thickness that is smaller than the thickness T0 of the central region 70a in the lateral direction. The folded regions 67 and 67 cause left and right lateral edges 60c and 60d of the unfolded body 60 to be close to the inlet opening 13a. The folding completed body 70A is accommodated in the housing-forming member 25.

The lateral width AWL of the cover material 80A which covers the folding completed body 70A is shorter than the folding completed body 70 since the folding completed body 70A has the folded regions 67 and 67 produced by the lateral reduction folding. Therefore, the belt-shaped section 81A or the lateral cover sections 86A and 86A are formed shorter than the belt-shaped section 81a or the lateral cover sections 86 of the cover material 8 shown in FIGS. 10A to 10D.

In addition, although the cover material 80 which covers the entire outer surface of the folding completed body 70 is used according to the first embodiment, the cover member may be disposed to cover minimum portions that can be designed to prevent unfolding and impurities from mixing, for example, only portions adjacent to the left and right end portions 70b and 70c which protrude laterally from the housing body part 40.

Furthermore, the cover material may be formed in the shape of a belt which partially wind the left and right end portions 70b and 70c in the front-to-back direction if there is not worry about the mixing of impurities.

However, in this cover material, it is preferable that the cover material can cover the folding completed body 70 so that the left and right end portions 70b and 70c do not sag downward when the end portions 70b and 70c protrude through the openings 27 and 27 of the housing body part 40 as in the cover material 80 according to the first embodiment.

In addition, although the first embodiment was illustrated in conjunction with the case where the left and right end portions 70b and 70c of the folding completed body 70 protrude through the openings 27 and 27 of the housing body part 40, a passenger seat airbag apparatus M2 according to a second embodiment can be configured as shown in FIG. 14 to FIG. 17.

In the airbag apparatus M2, a housing body part 40B has left and right openings 27 and 72, in which the lateral width CWL of the housing body part 40B is longer than that of the housing body part 40 according to the first embodiment, and the width CWL of the housing body part 40B is equal to the lateral width AWL of the folding completed body 70 of the airbag 10. According to the second embodiment, the lateral size of a bottom wall-forming region 41B of the housing body part 40B or front plate sections 46B and 49B of sidewall-forming regions 45B is longer than that of the front plate section 46 or 49 of the bottom wall-forming region 41 or the sidewall-forming regions 45 according to the first embodiment.

Furthermore, according to the second embodiment, the lateral size of an inner panel section 35B is longer than that of the inner panel section 35 according to the first embodiment.

Specifically, the second embodiment differs from the first embodiment in that the lateral width CWL of a molded product 55B for a housing which forms a door support section 36B and the housing body part 40B is longer than that of the molded product 55 for a housing according to the first embodiment. However, the material, the front-to-back width CLL or thickness H0, and the thickness t according to the second embodiment are equal to those of the first embodiment. In addition, the other constitutional parts including the airbag 10, the retainer 16 and the inflator 20 according to the second embodiment are configured the same as those of the first embodiment. Furthermore, the airbag apparatus M2 is produced by assembling the housing-forming member 25B the same process as that of the first embodiment and accommodating the airbag 10 in the housing-forming member 25B.

Since the lateral width CWL of the door support section 36B and the housing body part 40B is longer than that of the first embodiment, the ability of the second embodiment to reduce weight and save resources is not equal to that of the first embodiment. However, the other functions and effects of the second embodiment are equal to those of the first embodiment.

In addition, according to the first and second embodiments, the door section 31 of the ceiling-forming region 30, 30B of the housing-forming member 25, 25B can be disposed harmoniously on the upper wall section 6 only when the outer panel section 33 integral with the upper wall section 6 of the instrument panel 5 is disposed on the outer surface and the recess or recesses of the tearing section 34 are formed on a lower side of the outer panel section 33. In other words, the door section 31 can be formed as an invisible door section, and thus the airbag apparatus M1, M2 can be aesthetically mounted.

Furthermore, in this invisible door section 31, the door-coupling section 37 in the door support section 36, 36B of the inner panel section 35, 35B is coupled via fusion to a bottom side of the outer panel section 33. This configuration can consequently decrease the thickness of the ceiling-forming region 30, 30B and contribute to the small thickness (height) of the housing-forming member 25, 25B.

In addition, according to the first and second embodiments, since the coupling collar sections 47 and 50 of the front plate section 46, 46B or the rear plate section 49, 49B of the sidewall-forming regions 45, 45B of the housing body part 40, 40B are fused to the coupling regions 32a, 32b of the circumferential region 32, it is possible to form the housing-forming member 25, 25B while reducing the number of components.

In addition, when the door-coupling section 37 of the outer panel section 33 and the inner panel section 35, 35B, the collar coupling section 47, 50 of the sidewall-forming regions 45, 45B, and the coupling regions 32a and 32 of the circumferential region 32 of the ceiling-forming region 30 are coupled to each other via bonding in place of fusion, it is also possible to manufacture the airbag apparatus M1, M2 which includes the housing-forming member 25, 25A in a simple fashion while reducing the number of components.

In addition, the sidewall-forming regions and the ceiling-forming region can be coupled to each other mechanically using coupling components such as bolts and nuts.

Figure 18A:
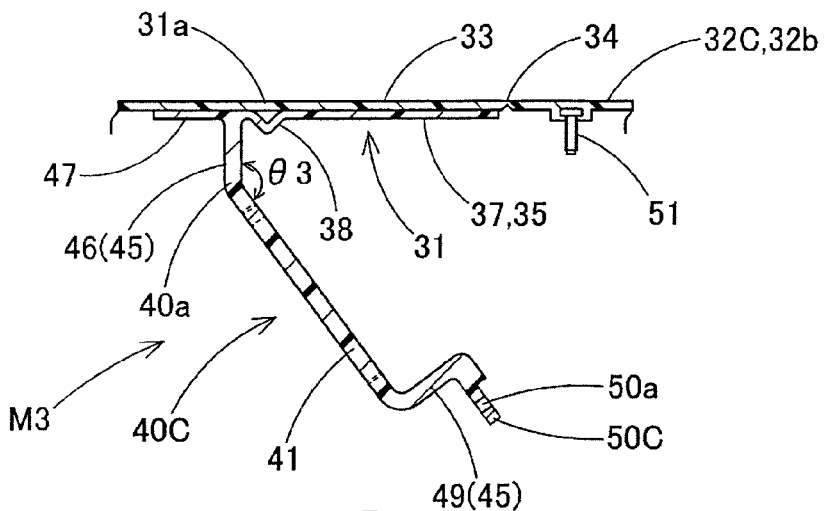
FIGS. 18A to 18C are views illustrating a process of assembling the airbag apparatus according to the third embodiment.
Figure 18B:
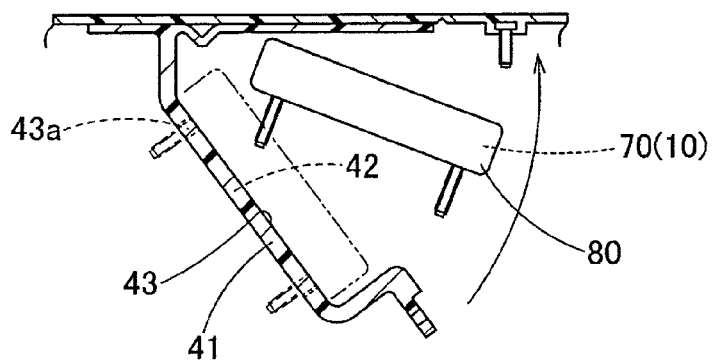
Figure 18C:
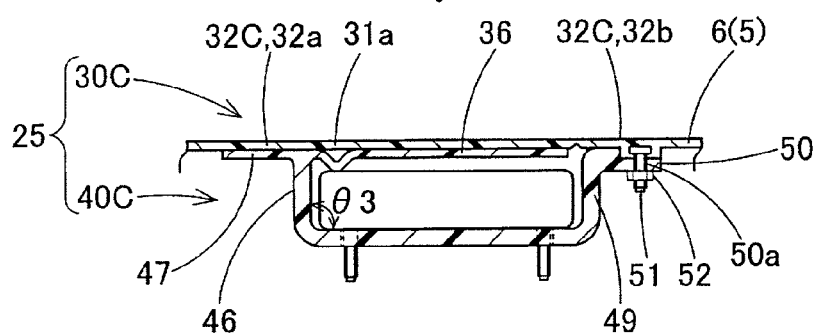

For instance, as in a passenger seat airbag apparatus M3 according to a third embodiment shown in FIGS. 18A to 18C, a housing body part 40C of a housing-forming member 25C may couple the coupling collar section 47 of the front plate section 46 of the sidewall-forming regions 45 to the coupling region 32a of a circumferential region 32C via fusion and a coupling collar section 50C of the rear plate section 49 to the rear coupling region 32b of the circumferential region 32C using bolts 51 and nuts 52.

The plurality of bolts 51 is provided in the lateral direction on the rear coupling region 32b of the circumferential region 32C such that the bolts extend downward, and the coupling collar section 50C has a plurality of attachment holes 50a which are arranged in parallel in the lateral direction. The bolts 51 are respectively fitted into the attachment holes 50a.

In the passenger seat airbag apparatus M3 according to the third embodiment, as shown in FIGS. 18A to 18C, when the housing-forming member 25C is assembled by coupling the coupling collar section 50C to the coupling region 32b of the circumferential region 32C while accommodating the folding completed body 70 of the airbag 10 wrapped by the cover material 80 in the housing-forming member 25C, it is possible to assemble the housing-forming member 25C only by the processes of respectively fitting the bolts 51 into the attachment holes 50a and fastening the nuts 52 around the bolts 51. It is therefore possible to perform the assembly process more simply than the case of fusing the coupling collar section 50 to the coupling region 32b.

Figure 20:
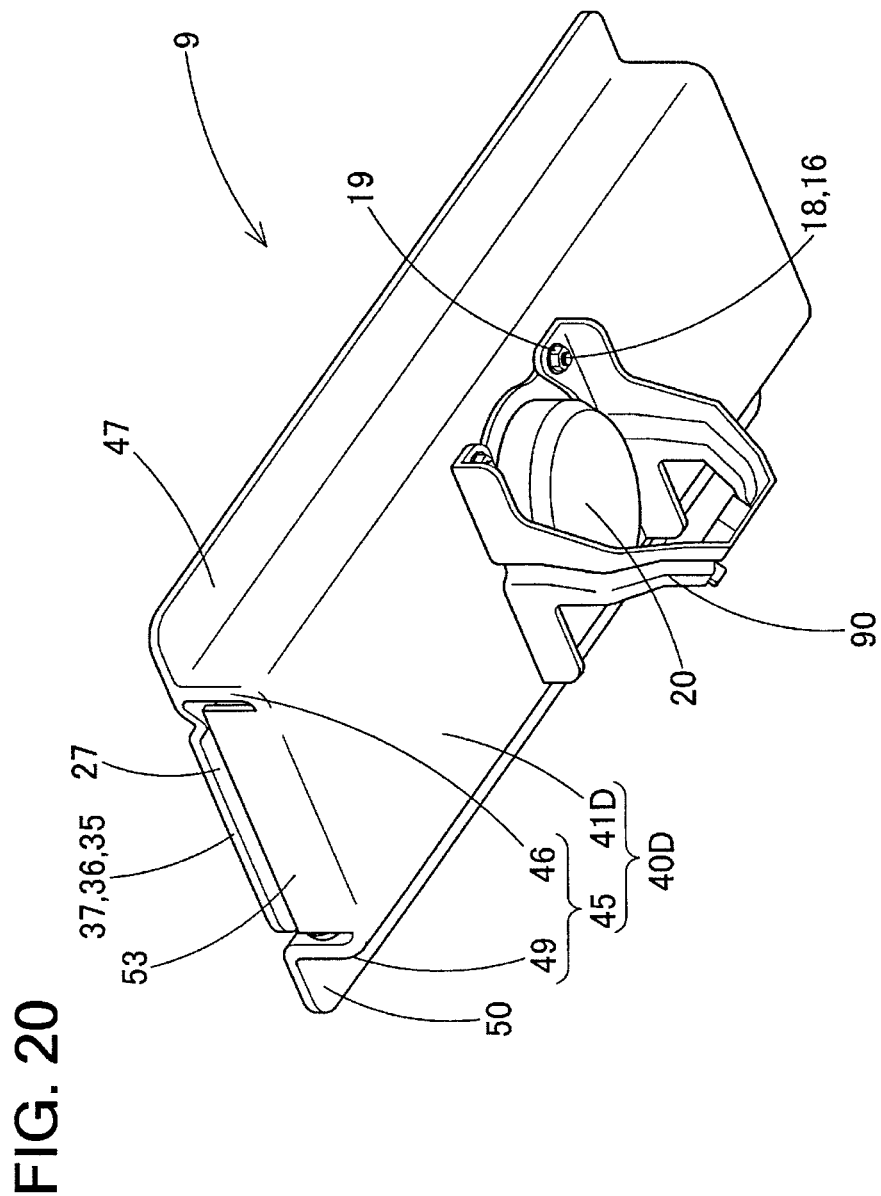
FIG. 20 is a perspective view of a body of the airbag apparatus according to the fourth embodiment.

In addition, in the airbag apparatus M2 according to the second embodiment shown in FIG. 14 to FIG. 17, the housing body part 40B was illustrated as having the left and right openings 27 and 27. Alternatively, as in a housing-forming region 25D of a passenger seat airbag apparatus M4 according to a fourth embodiment shown in FIG. 19 and FIG. 20, side plate sections 53 and 53 which partially cover the left and right openings 27 and 27 may protrude from a bottom wall-forming region 41D or a ceiling-forming region 30D.

In the passenger seat airbag apparatus M4 according to the fourth embodiment, it is possible to prevent impurities from mixing into the housing-forming region 25D using the left and right side plate sections 53 and 53 of the housing-forming region 25D.

Figure 21:
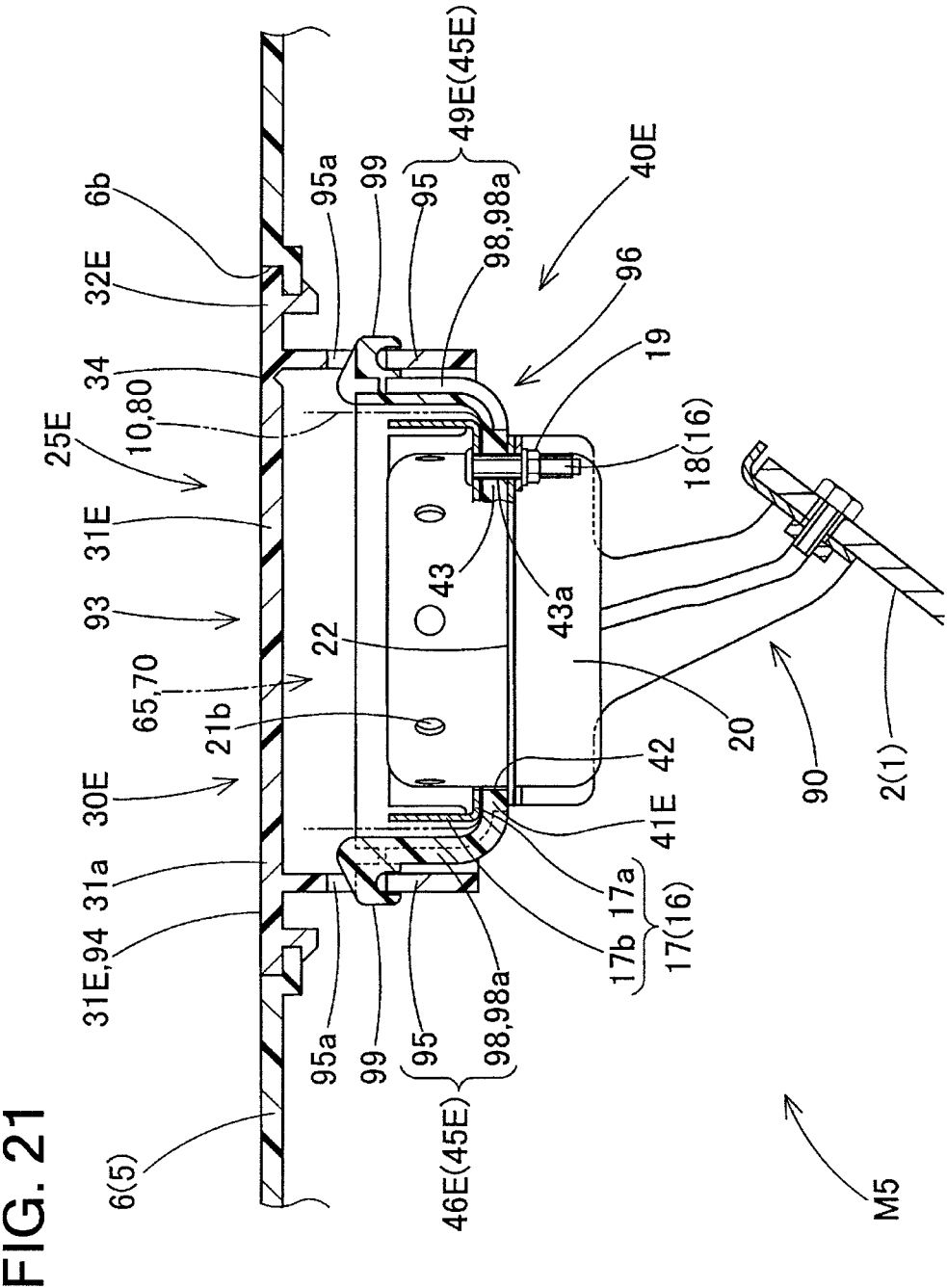
FIG. 21 is a schematic enlarged vertical cross-sectional view taken along a front-to-back direction of a vehicle, showing the state of use of a passenger seat airbag apparatus according to a fifth embodiment.
Figure 22:
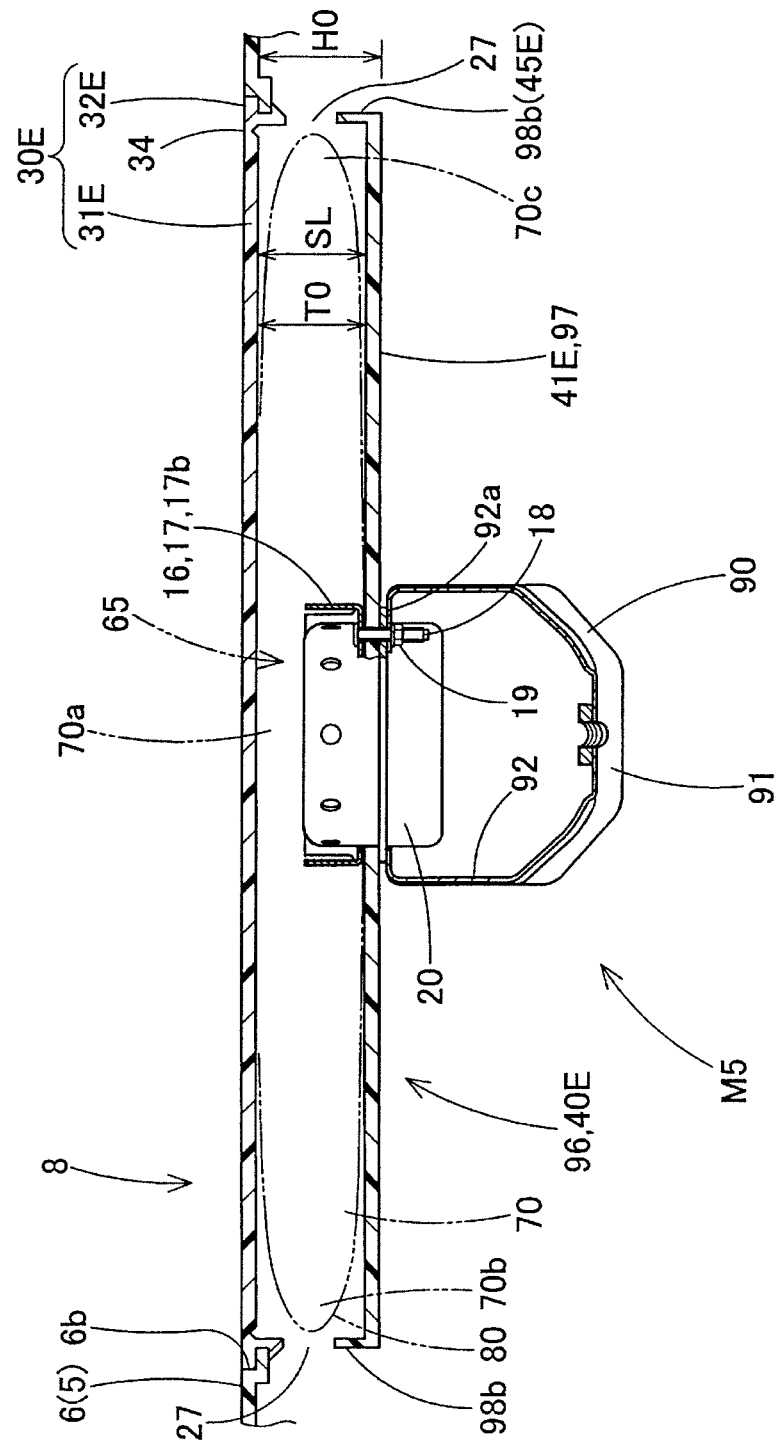
FIG. 22 is a schematic vertical cross-sectional view taken along the lateral direction of the vehicle, showing the state of use of the passenger seat airbag apparatus according to the fifth embodiment.

Furthermore, in the respective embodiments, the ceiling-forming region 30, 30B, 30C, 30D was illustrated as using the outer panel section 33 that is integral with the upper wall section 6 of the instrument panel 5. Alternatively, as in a passenger seat airbag apparatus M5 according to a fifth embodiment shown in FIG. 21 and FIG. 22, a ceiling-forming region 30E of a housing-forming member 25E may be provided as a separate body from the instrument panel 5.

In the airbag apparatus M5, a housing-forming member 25E includes a box-shaped housing body part 40E which accommodates the folded airbag 10 and the inflator 20 and a ceiling-forming region 30E which is to be pushed and opened by the airbag 10 that is being inflated. The housing body part 40E includes a bottom wall-forming region 41E which couples the airbag 10 and the inflator 20 to each other and sidewall-forming regions 45E which couple the bottom wall-forming region 41E and the ceiling-forming region 30E to each other. In addition, according to the fifth embodiment, the housing-forming member 25E is provided as two components including an airbag cover 93 and a case 96.

The airbag cover 93 is made of a synthetic resin such as polyolefin, and includes a ceiling plate section 94 having the shape of a rectangular plate and connecting piece sections 95 and 95 which extend downward from portions adjacent to the front and rear edge of the ceiling plate section 94. The ceiling plate section 94 is engaged with the circumference of the opening 6b provided in the mounting region 8 of the upper wall section 6 of the instrument panel 5 so as to close the opening 6b. A door section 31E which is pushed and opened forward by the airbag 10 that is being inflated is disposed at a central portion of the ceiling plate section 94. A thin tearing section 34E is provided at the circumference of the door section 31E, and is substantially U-shaped when viewed from above. In addition, the hinge section 31a of the door section 31E is a region of a front edge of the door section 31E where the tearing section 34E is not formed.

The connecting piece sections 95 and 95 extend downward from portions of the ceiling plate section 94 adjacent to front and rear edges of the circumferential region 32E in the circumference of the door section 31E. The connecting piece sections 95 and 95 have a plurality of engagement holes 95a which are formed in parallel in the lateral direction, and into which engagement hooks 99 of the case 96 which will be described later are fitted.

The case 96 is made of synthetic resin or a sheet metal (synthetic resin in the illustrated example) and is substantially rectangular shaped. The case 96 includes a bottom wall section 97 which forms the bottom wall-forming region 41E for coupling the airbag 10 and the inflator 20 to each other and a cylindrical sidewall section 98 which extends upward from front, rear, left and right edges of the bottom wall section 97. In addition, the plurality of engagement hooks 99 is formed in front and rear side plate sections 98a of the sidewall section 98. The engagement hooks 99 are fitted into the engagement holes 95a in order to engage the connecting piece sections 95.

In addition, according to the fifth embodiment, the sidewall-forming regions 45E which connect the bottom wall-forming region 41E to the ceiling-forming region 30E include the front and rear piece connecting sections 95 and 95 of the airbag cover 93 and the front and rear side plate sections 98*a* and 98*a* of the case 96.

In other words, the housing-forming member 25E according to the fifth embodiment includes the ceiling-forming region 30E which is formed as the ceiling plate section 94 of the airbag cover 93 and the housing body part 40E. The housing body part 40E includes the bottom wall-forming region 41E which is formed as the bottom wall section 97 of the case 96 and the sidewall-forming regions 45E which connect the bottom wall-forming region 41E and the ceiling-forming region 30E to each other. The sidewall-forming regions 45E is formed as the front and rear connecting piece sections 95 and 95 of the airbag cover 93 and the front and rear side plate sections 98*a* and 98*a* of the case 96.

In addition, also in the airbag apparatus M5, the distance SL from the ceiling-forming region 30E to the bottom wall-forming region 41E of the housing body part 40E is set corresponding to the thickness T0 of the folded region 65 which are produced through the front-to-back reduction folding such that housing body part 40E can accommodate the folded region 65 produced through the front-to-back reduction folding in the central region 70*a* of the folding completed body 70. In addition, the bottom wall-forming region 41E is connected to the ceiling-forming region 30E via the sidewall-forming regions 45 and through the engagement of the engagement hooks 99 into the connecting piece sections 95 such that the strength of the housing body part 40E can resist against the pressure of the airbag 10 that is being inflated.

Accordingly, as in the first embodiment, according to the fifth embodiment, the thickness H0 of the housing body part 40E and the thickness T0 of the folded airbag 10 can be reduced, and the upward-downward size can be reduced. Therefore, even if the upward-downward space of the mounting region 8 at an upper side of the instrument panel 5 is small, the airbag apparatus can be easily mounted.

Furthermore, according to the fifth embodiment, although the connecting piece sections 95 of the airbag cover 93 are provided at front and rear sides for the sidewall-forming regions 45E of housing body part 40E, none of the connecting piece sections 95 is provided to either the left or right. In addition, the height of the left and right side plate sections 98*b* of the sidewall section 98 of the case 96 is lower than the height of the front and rear side plate sections 98*a*, and the openings 27 are disposed to the left and right of housing-forming member 25E (housing body part 40E). It is therefore possible to design the airbag apparatus M5 to reduce the weight and save resources.

In the meantime, as in the second embodiment, according to the fifth embodiment, the housing body part 40E formed as the connecting piece sections 95 of the airbag cover 93 and the case 96 is configured such that the housing body part 40E can accommodate the entire lateral length of the folding completed body 70 of the airbag 10. Alternatively, as in the first embodiment, the lateral width CWL may be reduced such that the left and right end portions 70*b* and 70*c* can protrude. In this case, the case 96 can, of course, be made of synthetic resin or metal such as a sheet metal.

What is claimed is:

1. A passenger seat airbag apparatus mounted in an upper side of an instrument panel in front of a passenger seat next to a driver's seat comprising:
    a folded airbag;
    an inflator that supplies an inflation gas into the airbag; and
    a housing-forming member that accommodates the folded airbag,
    wherein the airbag includes:
        an outer circumferential wall which has a passenger side panel section disposed at a passenger side when inflation of the airbag is completed and a vehicle body side panel section extending forward from the passenger side panel section;
        an inlet opening for the inflation gas which is positioned at a front lower side of the vehicle body side panel section; and
        a circumference of the inlet opening which forms an attachment to which the housing-forming member is attached,
    wherein the airbag is accommodated in the housing-forming member by forming an unfolded body in a flat deployed state by placing the passenger side panel section on the vehicle body side panel section under which the inlet opening is disposed, and then forming a folding completed body by folding the unfolded body through reduction folding that reduces an outer size of an outer circumference of the unfolded body to be close to the inlet opening so that the folding completed body is accommodated in the housing-forming member,
    wherein the housing-forming member includes:
        a ceiling-forming region which covers an upper side of the folding completed body of the airbag and has a door section which is to be pushed and opened by the airbag when the airbag is being inflated; and
        a housing body part which covers the folding completed body of the airbag at a lower side of the ceiling-forming region and includes:
            a bottom wall-forming region to which the inflator and the attachment region of the airbag are attached; and
            sidewall-forming regions which are disposed between the bottom wall-forming region and the ceiling-forming region,
    wherein the folding completed body of the airbag is folded through front-to-back reduction folding that reduces a size of the unfolded body in a front-to-back direction by restricting a reduction in a lateral size of the folding completed body so that a length of the folding completed body in a lateral direction is greater than a length of the folding completed body in the front-to-back direction, and at least a central region in the lateral direction becomes only a folded region of the front-to-back reduction folding,
    wherein a distance from the ceiling-forming region to the bottom wall-forming region of the housing body part is set to correspond to a thickness of the folded region that has been folded through the front-to-back reduction foldin such that the folded region that has been folded through the front-to-back reduction folding is accommodated in the central region of the folding completed body, and
    wherein the bottom wall-forming region is connected to the ceiling-forming region via the sidewall-forming regions so that the housing body region has a strength and does not break down by a pressure of the airbag when the airbag is being inflated,
    wherein the sidewall-forming regions of the housing body part which connect the bottom wall-forming region and the ceiling-forming region to each other are disposed only at front and rear sides.

2. A passenger seat airbag apparatus mounted in an upper side of an instrument panel in front of a passenger seat next to a driver's seat comprising:

a folded airbag;
an inflator that supplies an inflation gas into the airbag; and
a housing-forming member that accommodates the folded airbag,
wherein the airbag includes:
an outer circumferential wall which has a passenger side panel section disposed at a passenger side when inflation of the airbag is completed and a vehicle body side panel section extending forward from the passenger side panel section;
an inlet opening for the inflation gas which is positioned at a front lower side of the vehicle body side panel section; and
a circumference of the inlet opening which forms an attachment to which the housing-forming member is attached,
wherein the airbag is accommodated in the housing-forming member by forming an unfolded body in a flat deployed state by placing the passenger side panel section on the vehicle body side panel section under which the inlet opening is disposed, and then forming a folding completed body by folding the unfolded body through reduction folding that reduces an outer size of an outer circumference of the unfolded body to be close to the inlet opening so that the folding completed body is accommodated in the housing-forming member,
wherein the housing-forming member includes:
a ceiling-forming region which covers an upper side of the folding completed body of the airbag and has a door section which is to be pushed and opened by the airbag when the airbag is being inflated; and
a housing body part which covers the folding completed body of the airbag at a lower side of the ceiling-forming region and includes:
a bottom wall-forming region to which the inflator and the attachment region of the airbag are attached; and
sidewall-forming regions which are disposed between the bottom wall-forming region and the ceiling-forming region,
wherein the folding completed body of the airbag is folded through front-to-back reduction folding that reduces a size of the unfolded body in a front-to-back direction by restricting a reduction in a lateral size of the folding completed body so that a length of the folding completed body in a lateral direction is greater than a length of the folding completed body in the front-to-back direction, and at least a central region in the lateral direction becomes only a folded region of the front-to-back reduction folding,
wherein a distance from the ceiling-forming region to the bottom wall-forming region of the housing body part is set to correspond to a thickness of the folded region that has been folded through the front-to-back reduction folding such that the folded region that has been folded through the front-to-back reduction folding is accommodated in the central region of the folding completed body, and
wherein the bottom wall-forming region is connected to the ceiling-forming region via the sidewall-forming regions so that the housing body region has a strength and does not break down by a pressure of the airbag when the airbag is being inflated,
wherein
the housing body part has openings disposed at right and left sides, and
the folding completed body of the airbag is accommodated in the housing-forming member in a state in which right and left ends of the folding completed body protrude from the openings of the housing body part.

3. A passenger seat airbag apparatus mounted in an upper side of an instrument panel in front of a passenger seat next to a driver's seat comprising:
a folded airbag;
an inflator that supplies an inflation gas into the airbag; and
a housing-forming member that accommodates the folded airbag,
wherein the airbag includes:
an outer circumferential wall which has a passenger side panel section disposed at a passenger side when inflation of the airbag is completed and a vehicle body side panel section extending forward from the passenger side panel section;
an inlet opening for the inflation gas which is positioned at a front lower side of the vehicle body side panel section; and
a circumference of the inlet opening which forms an attachment region to which the housing-forming member is attached,
wherein the airbag is accommodated in the housing-forming member by forming an unfolded body in a flat deployed state by placing the passenger side pan section on the vehicle body side panel section under which the inlet opening is disposed, and then forming a folding completed body by folding the unfolded body through reduction folding that reduces an outer size of an outer circumference of the unfolded body to be close to the inlet opening so that the folding completed body is accommodated in the housing-forming member,
wherein the housing-forming member includes:
a ceiling-forming region which covers an upper side of the folding completed body of the airbag and has a door section which is to be pushed and opened by the airbag when the airbag is being inflated; and
a housing body part which covers the folding completed body of the airbag at a lower side of the ceiling-forming region and includes:
a bottom wall-forming region to which the inflator and the attachment region of the airbag are attached; and
sidewall-forming regions which are disposed between the bottom wall-forming region and the ceiling-forming region,
wherein the folding completed body of the airbag is folded through front-to-back reduction folding that reduces a size of the unfolded body in a front-to-back direction by restricting a reduction in a lateral size of the folding completed body so that a length of the folding completed body in a lateral direction is greater than a length of the folding completed body in the front-to-back direction, and at least a central region in the lateral direction becomes only a folded region of the front-to-back reduction folding,
wherein a distance from the ceiling-forming region to the bottom wall-forming region of the housing body part is set to correspond to a thickness of the folded region that has been folded through the front-to-back reduction folding such that the folded region that has been folded through the front-to-back reduction folding is accommodated in the central region of the folding completed body, and
wherein the bottom wall-forming region is connected to the ceiling-forming region via the sidewall-forming regions so that the housing body region has a strength and does not break down by a pressure of the airbag when the airbag is being inflated,
wherein the folding completed body of the airbag comprises folded regions that are produced through lateral reduction folding at right and left end sides, the folded regions causing lateral edges of the unfolded body to be close to the inlet opening, within a range of thickness that is smaller than a thickness of the central region in the lateral direction.

* * * * *